United States Patent [19]
Suehiro et al.

[11] Patent Number: 6,017,137
[45] Date of Patent: Jan. 25, 2000

[54] AUTOMOBILE HEADLAMP

[75] Inventors: Yoshio Suehiro; Masahiro Kusagaya; Katutada Shirai, all of Shizuoka, Japan

[73] Assignee: Koito Manufacturing Co., Ltd., Tokyo, Japan

[21] Appl. No.: 09/025,452

[22] Filed: Feb. 18, 1998

[30] Foreign Application Priority Data

Feb. 18, 1997 [JP] Japan .................................. 9-033670
Jun. 27, 1997 [JP] Japan .................................. 9-172317
Dec. 22, 1997 [JP] Japan .................................. 9-352730

[51] Int. Cl.⁷ ........................................................ F21Q 1/00
[52] U.S. Cl. .......................... 362/289; 362/529; 362/428
[58] Field of Search .................................. 362/289, 287, 362/523, 529, 530, 419, 421, 428

[56] References Cited

U.S. PATENT DOCUMENTS

| | | | |
|---|---|---|---|
| 4,580,202 | 4/1986 | Morette | 362/523 X |
| 5,032,964 | 7/1991 | Endo et al. | 362/287 X |
| 5,183,331 | 2/1993 | Edgell et al. | 362/287 X |
| 5,351,170 | 9/1994 | Nagengast et al. | 362/289 X |
| 5,573,326 | 11/1996 | Iijima | 362/289 X |
| 5,871,276 | 2/1999 | Kowall et al. | 362/428 X |

*Primary Examiner*—Laura K. Tso
*Attorney, Agent, or Firm*—Sughrue, Mion, Zinn, Macpeak & Seas, PLLC

[57] ABSTRACT

An automobile headlamp is equipped with a lamp body that can deal with different aiming specifications. An automobile headlamp such that a light source unit in a lamp body is made tiltable vertically and horizontally by an aiming mechanism, and rotatable portions of a vertical and a horizontal aiming screw as members of the aiming mechanism, are provided outside the lamp body, so that these rotatable portions are turned to adjust the light source unit by tilting the light source vertically and horizontally. A cap can be fitted to the rotatable portion of at least the horizontal adjustable aiming screw in order to cover the rotatable portion thereof where horizontal aiming is unnecessary according to specifications applicable to the headlamp. Thus, horizontal aiming is made ineffective by not allowing a rotatable tool to engage with the rotatable portion of the horizontal aiming screw.

20 Claims, 23 Drawing Sheets

AUTOMOBILE HEADLAMP

BACKGROUND OF THE INVENTION

1. Field of the Invention

The present invention relates to an automobile headlamp in which a light source unit housed in a lamp body is supported so that it can be tilted by an aiming mechanism in both vertical and horizontal directions, and more particularly to an automobile headlamp so structured that pivoted portions for turning aiming screws for adjusting the tilting of the light source unit are provided on an exterior of the lamp body.

2. Description of the Related Art

FIGS. 48, 49 show an automobile headlamp of the sort described above. In this lamp, a reflector 202 fitted with a bulb 206 as a light source is supported by three parts including two aiming screws 203, 204 which are passed through a lamp body 201 and longitudinally extended, and one ball joint 205. FIG. 48 is an elevational view of the reflector wherein the aiming screws 203, 204 are extended in a direction perpendicular to the surface of the drawing.

The aiming screws 203, 204 are rotatably borne in the respective pass-through portions of the lamp body 201, and nut members 207, 208 into which the respective aiming screws 203, 204 are screwed are fitted to the reflector 202 at the points where the reflector 202 is supported by the respective aiming screws 203, 204. Straight lines Lx, Ly connecting the respective nut members 207, 208 and the ball joint 205 as a rocking fulcrum are arranged so that both the lines meet at right angles as viewed from the front of the lamp.

When the aiming screws 203, 204 are turned, the nut members 207, 208 are moved back and forth along the respective aiming screws 203, 204, and the reflector 202 is tilted with respect to a horizontal and a vertical axis, whereby the irradiation angle of the lamp is made adjustable vertically and horizontally. In this case, pivoted portions 203a, 204a (not shown) for turning the respective aiming screws 203, 204 by a rotatable tool for turning screws D such as a screwdriver or a hexagonal spanner therewith, are formed in the respective rear end portions of the aiming screws 203, 204.

SUMMARY OF THE INVENTION

The aforesaid conventional headlamp is fit for export to Europe or for use in Japan where tilting of the reflector is required to be adjustable in both vertical and horizontal directions because both pivoted portions 203a, 204a, for turning the respective aiming screws 203, 204, are exposed on the back surface side of the lamp body 201. However, such a conventional headlamp is not fit for export to the U.S where the tilting of the reflector is required to adjustable in the vertical direction but not in the horizontal direction, because the pivoted portion 203a for adjusting the vertical tilting thereof and the pivoted portion 204a for use in adjusting the horizontal tilting thereof, are thus exposed.

Therefore it is necessary to change the specification of the headlamps for export to the U.S. such that the reflector 202 is not supported by the aiming screw 203 but, rather, by the ball joint in place of the aiming screw 203. In consequence, two kinds of lamp bodies different in specification have to be prepared for headlamps for either export to the U.S., or for either export to Europe or for use in Japan, and a problem arises from not only more complicated production, but also from an increase in costs.

An objective of the present invention, made in view of the foregoing problems, is to provide an automobile headlamp having a lamp body capable of dealing with different specifications.

In order to accomplish the objective above, an automobile headlamp according to one embodiment, is produced wherein a light source unit in a container-like lamp body is made tiltable vertically and horizontally by an aiming mechanism; and pivoted portions of a vertical and a horizontal aiming screw, as members of the aiming mechanism are provided outside the lamp body, so that these pivoted portions are turned to adjust the light source unit by tilting the light source vertically and horizontally, the headlamp including a cap fitted to the pivoted portion of the horizontal aiming screw to cover the pivoted portion thereof where horizontal aiming is unnecessary, according to the particular specification applicable to the headlamp.

Where the specification requires horizontal aiming, a pivoted tool such as a screwdriver, a spanner, a wrench or the like, is engaged with the pivoted portion of the horizontal aiming screw, which is exposed on the outside of the lamp body and used to turn the pivoted portion to adjust the light source unit by tilting it horizontally.

Where the specification does not require horizontal aiming, the cap is fitted to the pivoted portion of the horizontal aiming screw to cover the pivoted portion with the cap. Thus, the pivoted tool cannot engage with the pivoted portion, and the pivoted portion of the horizontal aiming screw is difficult to turn.

With respect to the pivoted portion of the aiming screw, the pivoted portion of the aiming screw may be a square bolt head whose outer diameter is greater than that of the shaft portion of the aiming screw, the square bolt being formed such that a pivoted tool like a wrench, a spanner or the like is allowed to engage therewith; the pivoted portion of the aiming screw being incorporated into the aiming screw so that the central axes of both the pivoted portion and the aiming screw conform to each other and are formed with a coronal gear engaging with the toothed portion of a plus screwdriver disposed in a direction substantially perpendicular to the aiming screw. A mating slot for permitting the toothed portion of the screwdriver as a pivoted tool to engage therewith, is formed in the edge face of the pivoted portion of the aiming screw. In addition, a combination of these embodiments (a combination of the coronal gear, the bolt head and the mating slot for permitting the toothed portion of the screwdriver) is possible.

According to another embodiment, the lamp body in the automobile headlamp is made of plastic and includes a vertical cylindrical wall surrounding at least the pivoted portion of the horizontal aiming screw and the cap fitted to the pivoted portion, the vertical wall being extended outward from the lamp body. The mating slot for engaging with the screwdriver as a pivoted tool in the edge face of the pivoted portion of the horizontal aiming screw is exposed on the extended end portion side of the vertical wall. Therefore, the pivoted portion is turned by engaging the screwdriver as a pivoted tool with the pivoted portion (mating slot) from the extended end portion side of the vertical wall to adjust the light source unit in the horizontal direction.

On the other hand, where the specification does not require the horizontal aiming screw, the cap is fitted to the horizontal aiming screw to cover the edge face of the pivoted portion with the cap, and the side of the pivoted portion is also covered with the vertical wall. Therefore, it is impossible for the pivoted tool to engage with the pivoted portion and the pivoted portion of the horizontal aiming screw cannot be turned. Moreover, the vertical wall functions as a protective cover for the cap fitted to the horizontal aiming screw and the pivoted portion.

In the automobile headlamp according to the same embodiment, and where the horizontal aiming screw is not required, the vertical wall and the top portion of the cap fitted to the pivoted portion are leveled off or the former is projected from the top portion of the cap, whereby the cap fitted to the pivoted portion is buried in the vertical wall and difficult to remove.

In the automobile headlamp according to many of the above embodiments, the cap is molded by monolithic molding from plastic, the cap comprising a top portion for covering the head of the pivoted portion, and a plurality of tongue-like elastic hooks, each of which is perpendicularly extended from the top portion and grips the outside face of the pivoted portion and is prevented from slipping out by engaging with the different-in-level portion on the pivoted portion side. When the cap is pressed so as to cover the head of the pivoted portion, the elastic hook undergoes elastic deformation outward as it is pressed by the outside face of the pivoted portion and also slides along the outside face of the pivoted portion, whereby the cap is prevented from slipping out by engaging with the different-in-level portion on the pivoted portion side, and kept in contact with the pivoted portion.

In the automobile headlamp according to at least one of the above embodiments, the cap is molded by monolithic molding from plastic, the cap comprising the top portion for covering the head of the pivoted portion, and a plurality of tongue-like elastic hooks, each of which is perpendicularly extended from the top portion and grips the screw shaft portion consecutively connected to the pivoted portion and is prevented from slipping out by engaging with the different-in-level portion on the pivoted portion side. When the cap is pressed so as to cover the head of the pivoted portion, the elastic hook undergoes elastic deformation outward as it is pressed by the outside face of the pivoted portion and also slides along the outside face of the pivoted portion to grip the screw shaft portion, whereby the cap is prevented from slipping out by engaging with the different-in-level portion on the pivoted portion side and kept in contact with the pivoted portion.

In the automobile headlamp according to another embodiment, the cap is molded by monolithic molding from plastic, the cap comprising a top portion for covering the head of the pivoted portion, a cylindrical portion which is extended substantially perpendicularly from the top portion and used to surround the outside face of the pivoted portion, and a plurality of tongue-like elastic hooks, each of which is formed by cutting and raising a part of the side wall of the cylindrical portion from the top portion side of the cap up to its opening portion side and extending the cut portion inward, and which is prevented from slipping out by engaging its extended front end portion with a different-in-level portion on the pivoted portion side. When the cap is pressed in so as to cover the head of the pivoted portion, the elastic hook undergoes elastic deformation outward as it is pressed by the outside face of the pivoted portion and also slides along the outside face of the pivoted portion to grip the screw shaft portion, whereby the cap is prevented from slipping out by engaging with the different-in-level portion on the pivoted portion side and kept in contact with the pivoted portion. Moreover, the whole cap is in the form of a closed-end cylindrical body and has greater strength.

In the automobile headlamp according to the same embodiment, the cap is molded by a pair of opposed molds comprising a first mold for molding the top portion of the cap and a second mold for molding the opening side of the cap, and provided with an opening portion corresponding to a mold projection for molding the surface side of each elastic hook projecting from the molding face of the first mold, the opening portion being provided in a position corresponding to the elastic hook ranging from the top portion up to the cylindrical portion, whereby the cap can be molded by monolithic molding from plastics without using a slide mold. Consequently, the mold structure is simplified, thus resulting in reduced costs.

In the automobile headlamp according to another embodiment, the inner diameter of the cylindrical portion of the cap is set greater than the maximum outer diameter of the pivoted portion, whereby the cap is idly turned with respect to the pivoted portion. Thus, the aiming screw is difficult to turn because the cap is idly turned.

In the automobile headlamp according to another embodiment, the cap is of a cup type tightly surrounding the pivoted portion and formed by monolithic molding from rubber with ribs formed in the circumferential direction in such a way as to prevent slipping by engaging the peripheral edge portion of the opening of the cup with the different-in-level portion on the pivoted portion side. In this case, the elasticity (flexibility) of the rubber is utilized to allow the cap fitted from the head of the pivoted portion, make the rib on the opening side of the cap engage with the different-in-level portion of the pivoted portion, to keep the cap fitted to the pivoted portion.

BRIEF DESCRIPTION OF THE DRAWINGS

FIG. 8 is a sectional view showing the elastic hook when the cap is fitted in.

FIG. 24 is a sectional view showing the elastic hook when the cap is fitted in.

FIG. 32 is a sectional view (taken on line XXXII—XXXII of FIG. 31) showing the elastic hook when the cap is fitted in.

DESCRIPTION OF THE PREFERRED EMBODIMENTS

Figure 1:
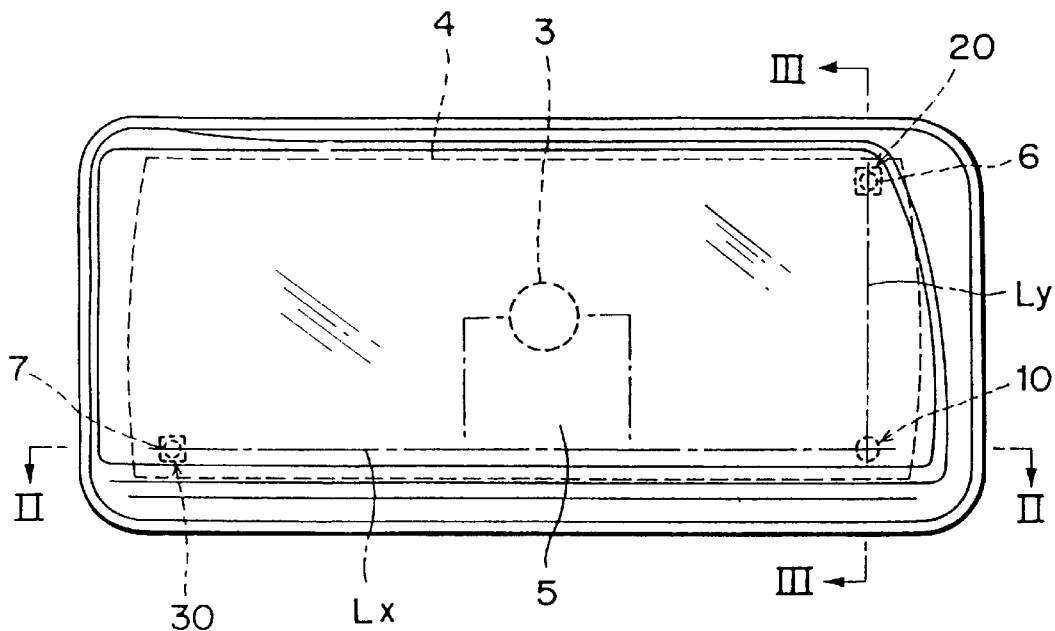
FIG. 1 is an elevational view of an automobile headlamp as a first embodiment of the present invention.
Figure 2:
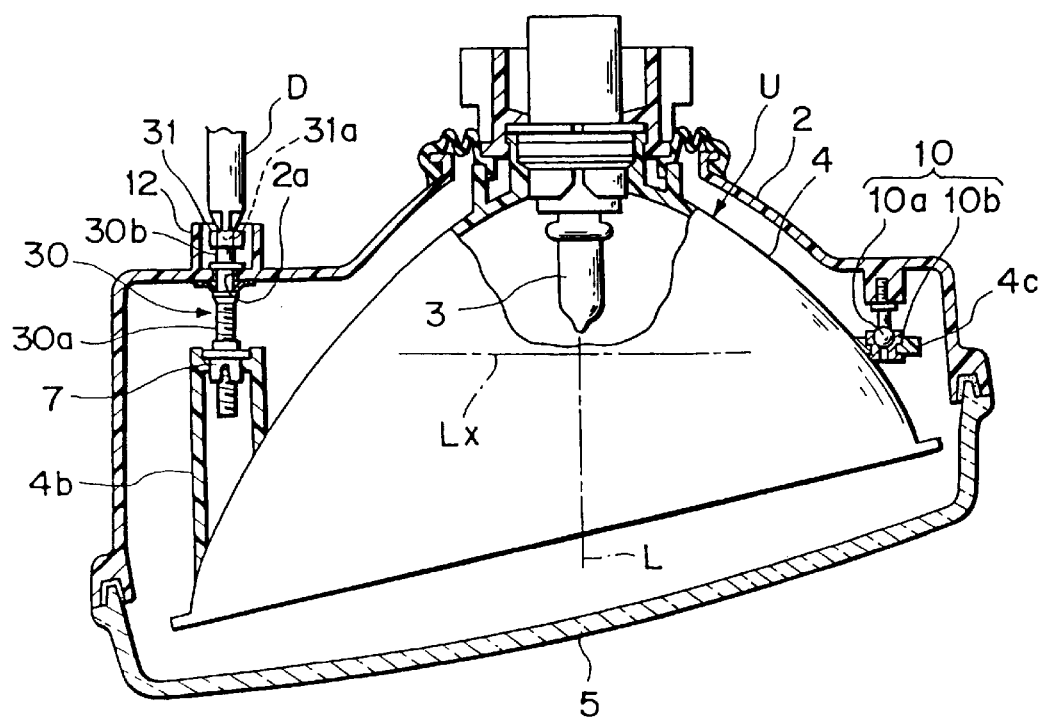
FIG. 2 is a horizontal sectional view (taken on line II—II of FIG. 1) of the headlamp.
Figure 3:
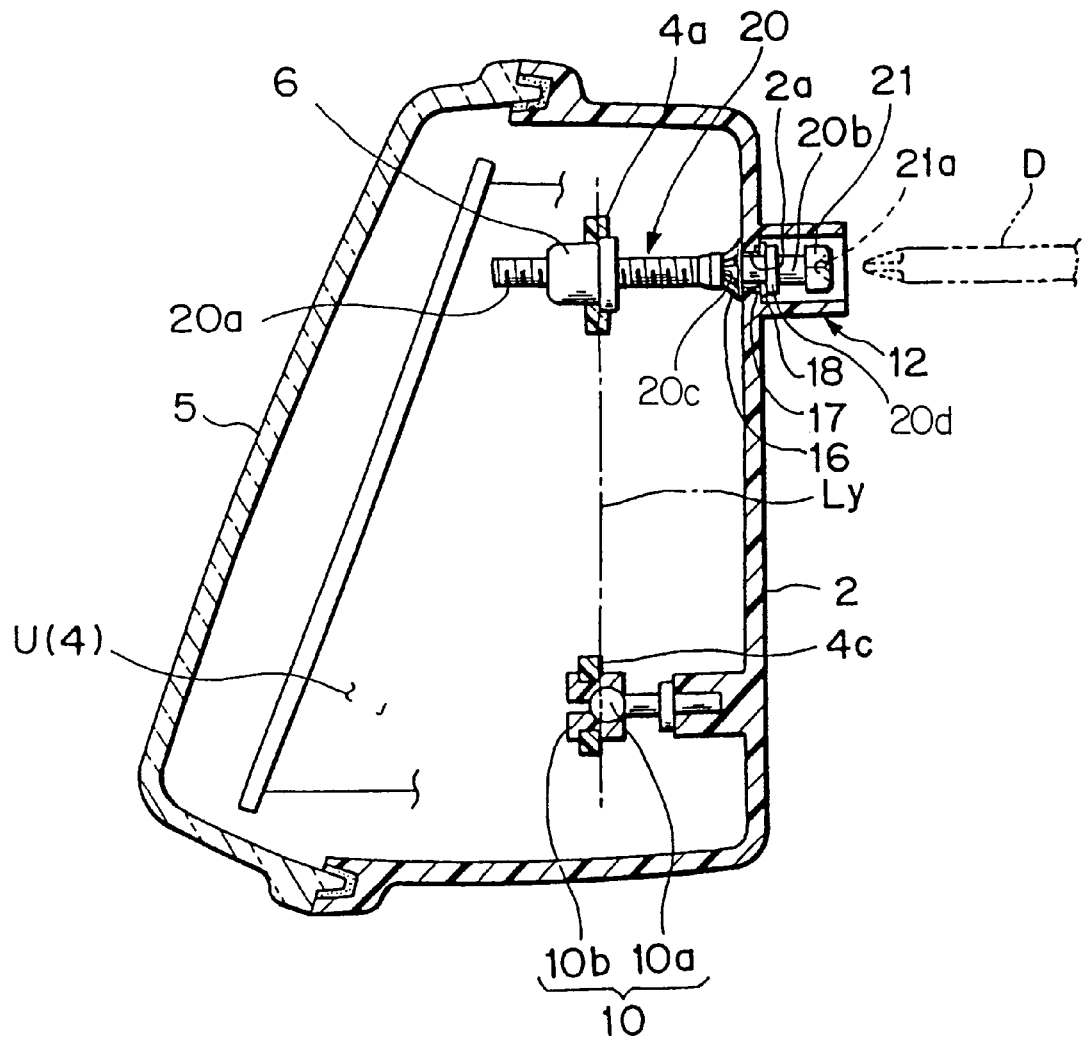
FIG. 3 is a vertical sectional view (taken on line III—III of FIG. 1) of the headlamp.
Figure 4:
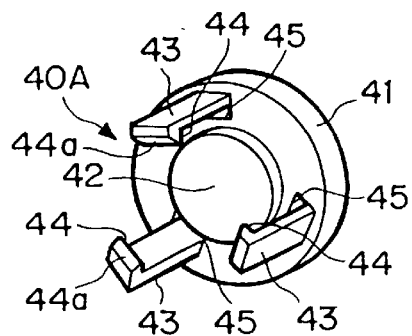
FIG. 4 is a perspective view of a cap fitted to the pivoted portion of an aiming screw.
Figure 5:
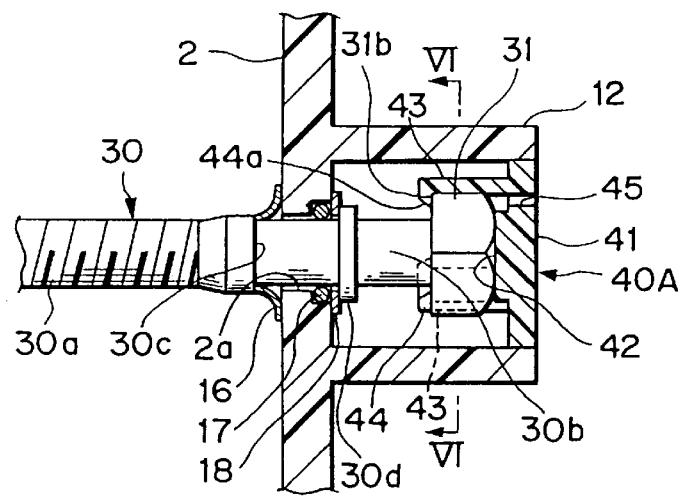
FIG. 5 is a vertical sectional view of the periphery of the pivoted portion of a horizontal aiming screw fitted with the cap.
Figure 6:
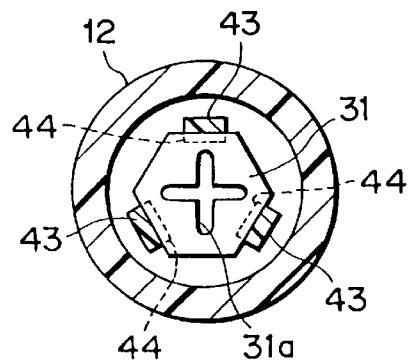
FIG. 6 is a sectional view (taken on line VI—VI of FIG. 5) of the cap fitted to the pivoted portion.
Figure 7:
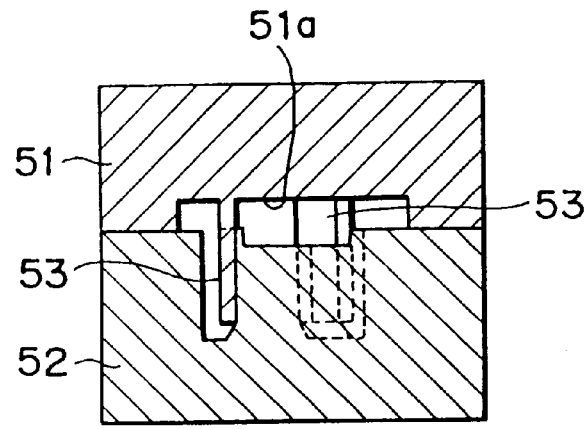
FIG. 7 is a sectional view of a mold for molding the cap.
Figure 8:
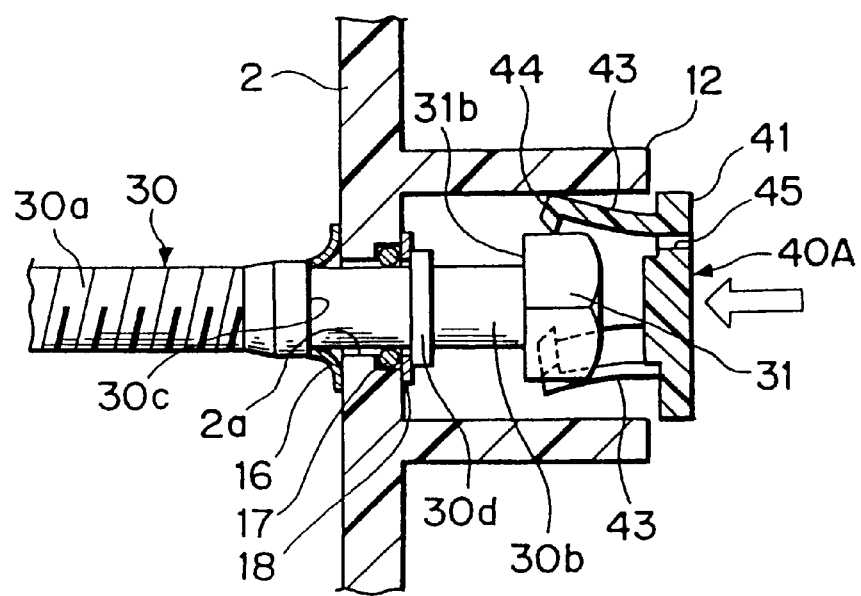

FIGS. 1–7 show a first embodiment of the present invention: FIG. 1 is an elevational view of an automobile headlamp in the first embodiment thereof; FIG. 2, a horizontal sectional view (sectional view taken on line II—II of FIG. 1) of the headlamp; FIG. 3, a vertical sectional view (sectional view taken on line III—III of FIG. 1) of the headlamp; FIG. 4, a perspective view of a cap fitted to a pivoted portion for turning an aiming screw; FIG. 5, a vertical sectional view of the peripheral portion of the pivoted portion for turning the horizontal aiming screw with the cap fitted thereto; FIG. 6, a sectional view (sectional view taken on line VI—VI of FIG. 5) of the cap fitted to the pivoted portion for turning the aiming screw; FIG. 7, a sectional view of a mold for forming the cap; and FIG. 8, a sectional view showing the function of an elastic hook for use when the cap is fitted thereto.

In these drawings, reference numeral 2 denotes a container-like plastic lamp body in which a light source unit U (a reflector 4 in a parabolic form fitted with a bulb 3 as a light source) is disposed and a front lens 5 is fitted in the front opening portion of the lamp body 2 to form an integral part of the headlamp.

The light source unit U (reflector 4) is fitted to a pair of aiming screws 20, 30 which are passed through respective screw through-holes 2a formed in the rear wall of the lamp body 2 and extended horizontally in the longitudinal direction and to brackets 4a, 4b which are projected from the rear side of the reflector 4. The light source unit U is also supported by an aiming mechanism in such a way that it is made tiltable vertically and horizontally by the aiming mechanism formed with nut members 6, 7 into which the aiming screws 20, 30 are screwed and a ball joint 10 installed between the reflector 4 and the lamp body 2.

The ball joint 10 is formed with a ball portion 10a projected to the side of the lamp body 2 and a ball receiving portion 10b fitted to a bracket 4c projected from the rear side of the reflector 4 and used for bearing the ball portion 10a. On the other hand, the aiming screws 20, 30 are disposed such that screw portions 20a, 30a are extended forward from the lamp body 2 and that screw shaft portions 20b, 30b are extended backward therefrom, each of the aiming screws 20, 30 being rotatably supported with the screw through-hole 2a. Reference numeral 16 denotes a push-on-fix as a plate spring installed between each of the different-in-level portions 20c, 30c on the aiming screw side and the peripheral edge portion of the screw through-hole 2a. The aiming screws 20, 30 are urged by the push-on-fixes 16 to be held while they are respectively press-welded to the peripheral edge portions of the screw through-holes 2a. Reference numeral 17 denotes an O-ring; and 18, a washer placed between the O-ring 17 and flanges 20d, 30d The screw portions 20a, 30a extended forward from the aiming screws 20, 30 are screwed into the respective nut members 6, 7, and pivoted portions 21, 31 capable of engaging with the toothed portion of a screwdriver D, a spanner or a wrench are formed on the screw shaft portions 20b, 30b projecting backward from the lamp body 2.

The pivoted portions 21, 31 respectively have hexagon bolt heads greater in diameter than the screw shaft portions, so that the pivoted tool such as a spanner or a wrench can engage therewith, and cross slots 21a, 31a capable of engaging with the toothed portion of such a screwdriver D are formed in the respective edge faces of the pivoted portions 21, 31 having the hexagon bolt heads.

The pivoted portions 21, 31 according to this embodiment of the present invention are respectively surrounded with projected walls 12 as covers for protecting the aiming screws lest other members such as power supply cords are brought into contact with the rear end portions of the aiming screws, thus permitting the aiming screws 20, 30 to turn freely. Consequently, the pivoted portions 21, 31 are made difficult to rotate using a spanner or wrench, and only are rotatable by using the screwdriver D.

When the screwdriver D is used to turn the pivoted portions 21, 31 (aiming screws 20, 30), the nut members 6, 7 are moved back and forth along the screw portions 20a, 30a, whereby the light source unit U (reflector 4) is tilted vertically and horizontally. In other words, the aiming screw 20 forms the vertical aiming screw for tilting the light source unit U around the horizontal axis Lx connecting the nut member 7 and the ball joint 10 (tilting vertically), whereas the aiming screw 30 forms the horizontal aiming screw for tilting the light source unit U around the vertical axis Ly connecting the nut member 6 and the ball joint 10 (tilting horizontally).

Reference numeral 40A denotes a plastic cap fitted to the pivoted portion 31 of the aiming screw 30 and as shown in an enlarged view of FIG. 4, the cap 40A is provided with a disc-like top portion 41 capable of covering the edge face (top portion of the hexagon bolt head) of the pivoted portion 31, and an elastic hook 43 extended substantially perpendicularly from three places at equal intervals in the circumferential direction of the top portion 41, used to grip the side face (outside face of the hexagon bolt head) of the pivoted portion 31 and prevented from slipping out by engaging with the different-in-level portion on the pivoted portion side.

Reference numeral 44 denotes a pawl portion formed at the front end of each elastic hook 43, which is forced to contact the outside face of the pivoted portion 31, and since the pawl portion 44 is prevented from slipping out by engaging with the different-in-level portion (the different-in-level portion between the pivoted portion 31 and the screw shaft) 31b on the pivoted portion side, the cap 40A is held in such a way as to cling to the pivoted portion 31 and is prevented from backlashing.

Further, a tilted face 44a for introducing the pivoted portion is formed on the inside of the front end portion of the elastic hook 43 and when the cap 40A is fitted in the pivoted portion 31, the head of the pivoted portion 31 is guided by the tilted face 44a and smoothly introduced on the inside of the elastic hook 43.

The central region 42 of the top portion 41 with which the edge face of the pivoted portion 31 is brought into contact, is made thicker than the outer peripheral edge region of the top portion and also, the length of the elastic hooks 43 are set longer in order to increase the flexibility of the elastic hooks 43.

Moreover, the cap 40A is formed by monolithic molding from plastic and there are also formed opening portions 45 respectively corresponding to mold projections 53 (see FIG. 7) for molding each rear side, which may become an undercut, of the elastic hook 43 when the cap is molded. More specifically, the cap 40A, as shown in FIG. 7, is molded with a pair of opposed molds comprising a first mold 51 for chiefly molding the top portion 41 and a second mold 52 for chiefly molding the elastic hooks 43. The mold projections 53 for molding the rear sides of the elastic hooks 43 are formed on the molding face 51a of the first mold 51.

The opening portion 45 formed in the top portion 41 functions to lower the rigidity of the joint between the top portion 41 and the elastic hook 43 and increases the flexibility of the elastic hook 43, so that the fitting of the cap 40A to the pivoted portion 31 is facilitated.

In order to fit the cap 40A to the pivoted portion 31 in one movement, the flexibility of the elastic hooks 43 is utilized. More specifically, as shown by an arrow in FIG. 8, the cap 40A with the elastic hooks 43 directed forward, is press-fitted to the pivoted portion 31 in the projected wall 12 and then the elastic hooks 43 are expanded by the head of the pivoted portion 31. Further, each pawl portion 44 is made to slide along the outside face of the head and as shown in FIG. 5, the pawl portion 44 engages with the different-in-level portion 31b, so that the cap 40A is prevented from slipping out.

FIGS. 5–6 show a state in which the cap 40A has been fitted to the pivoted portion 31 and in this state, the cross slot 31a formed in the pivoted portion 31 is covered with the cap 40A, and this makes it difficult to mate the toothed portion of the screwdriver D with the cross slot 31a.

Although cylindrical projected walls 12 as protective covers surrounding the rear end portions of the screws, are respectively extended backward in positions where the horizontal aiming screw 30 and the vertical aiming screw 20 of the lamp body 2 are arranged, the inner diameter of each projected wall 12 is so sized that the cap 40A is properly fitted in. Thus, the cap 40A fitted to the pivoted portion 31 is, as shown in FIG. 5, neatly accommodated in the projected wall 12, and it becomes difficult for the toothed portion of the screwdriver D, much less a spanner or a wrench, to mate with the pivoted portion 31. Moreover, the top portion of the cap 40A fitted to the pivoted portion 31 and the opening edge portion of the projected wall 12 are leveled off, whereby the cap 40A cannot be removed easily.

In the case of headlamps for export to Europe or for use in Japan, that is, when the specifications require making vertical and horizontal aiming screws rotatable, the cap 40A is not fitted to either the pivoted portion 21 for vertical aiming, or the pivoted portion 31 for horizontal aiming. In other words, since the screwdriver D is used for turning the pivoted portions 21, 31, the optical axis of such a headlamp is adjusted by tilting it vertically and horizontally.

If it is necessary to change the specification of the headlamps for export to the U.S. such that the horizontal aiming screw is not made rotatable, the cap 40A is not fitted to the pivoted portion 21 for vertical aiming, but fitted to the pivoted portion 31 for horizontal aiming, whereby the headlamps become fit for export to the U.S. In other words, since the pivoted portion 31 is not rotatable, though the pivoted portion 21 is made rotatable by means of the screwdriver D, the optical axis of such a headlamp can be so arranged that it is vertically tiltable.

Although the projected wall 12 which is extended so as to surround the pivoted portion 31, has been formed to the size required to mate with the cap 40A according to the preceding embodiment of the present invention, the inner diameter of the projected wall 12 may be set slightly greater than the outer diameter of the cap 40A to improve the cap-fitting workability. In the case where a gap is formed between the top portion 41 of the cap 40A fitted to the pivoted portion 31 and the projected wall 12 in particular, it is desirable to form a drainage hole or slit in the projected wall 12.

Figure 9:
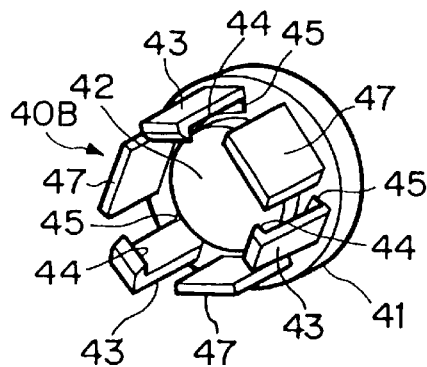
FIG. 9 is a perspective view of a cap as the principal part of a second embodiment of the present invention.
Figure 10:
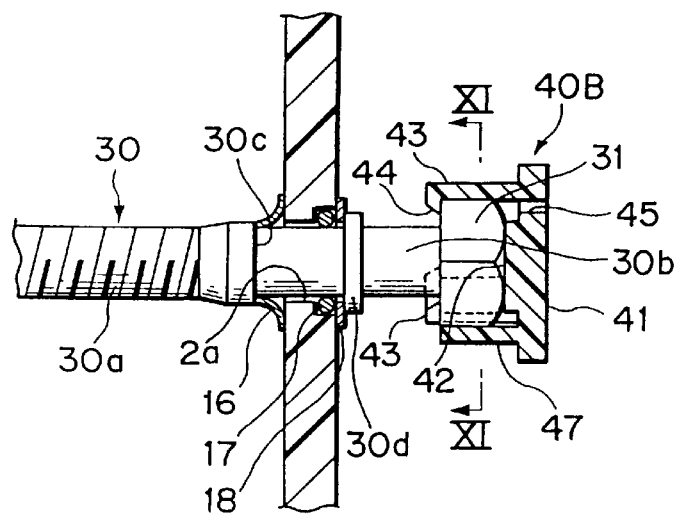
FIG. 10 is a vertical sectional view of the periphery of the pivoted portion of the horizontal aiming screw fitted with the cap.
Figure 11:
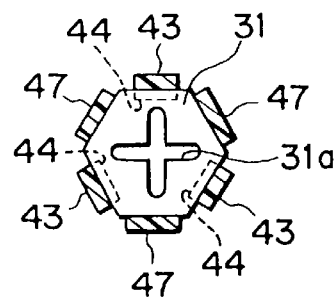
FIG. 11 is a sectional view (taken on line XI—XI of FIG. 10) of the cap fitted to the pivoted portion.

FIGS. 9–11 show the principal parts of a second embodiment of the present invention: FIG. 9 is a perspective view of a cap; FIG. 10, a vertical sectional view of the periphery of the pivoted portion of a horizontal aiming screw with the cap fitted thereto; and FIG. 11, a sectional view (sectional view taken on line XI—XI of FIG. 10) of the cap fitted to the pivoted portion.

In the second embodiment of the present invention, the cylindrical projected walls 12 of the first embodiment thereof are provided and the pivoted portions 21, 31 of the aiming screws are exposed on the rear side of the lamp body 2 without being covered by the respective projected walls 12. For this reason, it is possible to turn the pivoted portions 21, 31 by the use of not only the screwdriver D, but also a spanner or a wrench.

Since the pivoted portions 21, 31 are exposed on the rear side of the lamp body 2 without being covered with the respective projected wall 12, a worker is able to visually recognize the pivoted portions 21, 31 from above the headlamp, and consequently, the aiming work for adjusting the pivoted portions by engaging a pivoted tool, such as the screwdriver D, with the pivoted portions 21, 31, to turn them, is facilitated.

Moreover, the absence of the projected wall 12 surrounding the pivoted portion 31 also facilitates the work of fitting a cap 40B to the pivoted portion 31.

Further, a plate-like contact portion 47 which is brought into contact with the outside face of the pivoted portion 31 is perpendicularly formed between adjoining elastic hooks 43 of the cap 40B. When the cap 40B is consequently fitted to the pivoted portion 31, the elastic hook 43 and the contact portion 47 are, as shown in FIGS. 10, 11, put in such a state that each of them is press-fitted to the outside face of the pivoted portion 31, whereby the cap 40B is held firmly by the pivoted portion 31 and not allowed the possibility of any backlash, in comparison with the cap 40A in the first embodiment of the present invention.

The repeated description of the other component parts of the second embodiment of the present invention will be omitted with like reference characters given to like component parts of the first embodiment thereof.

Figure 12:
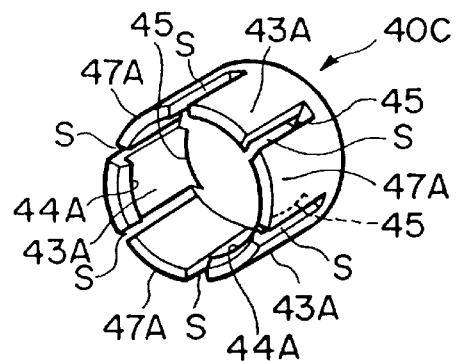
FIG. 12 is a perspective view of a cap as the principal part of a third embodiment of the present invention.
Figure 13:
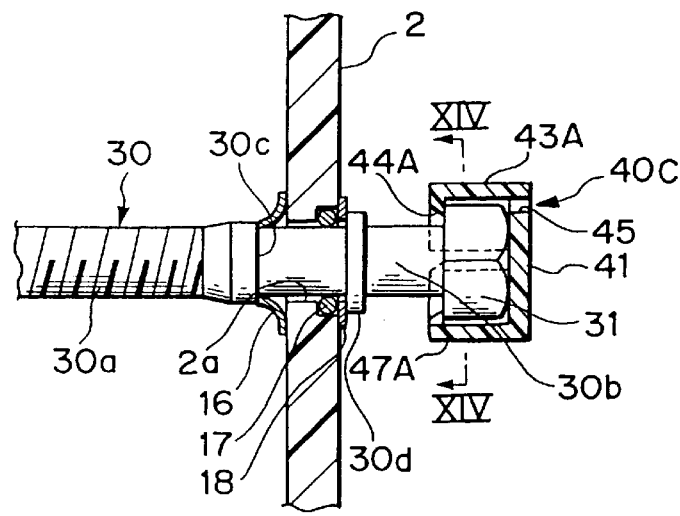
FIG. 13 is a vertical sectional view of the periphery of the pivoted portion of the horizontal aiming screw fitted with the cap.
Figure 14:
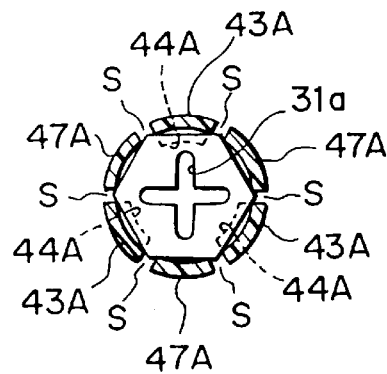
FIG. 14 is a sectional view (taken on line XIV—XIV of FIG. 13) of the cap fitted to the pivoted portion.

FIGS. 12–14 show the principal parts of a third embodiment of the present invention: FIG. 12 is a perspective view of a cap as the principal part of the third embodiment thereof; FIG. 13, a vertical sectional view of a form on the periphery of the pivoted portion of a horizontal aiming screw fitted with the cap; and FIG. 14, a sectional view (sectional view taken on line XIV—XIV of FIG. 13) of the cap fitted to the pivoted portion.

In the third embodiment of the present invention, a cap 40C fitted to the pivoted portion 31 is a plastic closed-end cylindrical body with a cylindrical portion formed on the outer peripheral edge of the disc-like top portion 41 and provided with a slit S which is formed at six places at equal intervals in the circumferential direction of the outer peripheral wall of the cylindrical portion and extended longitudinally, and the elastic hooks 43 each having pawl portions 44A and contact portions 47A each having no pawl portions which are formed at equal intervals in the circumferential direction. As shown in FIG. 14, six edge portions of the outside face of the pivoted portion 31 engage with the respective slits S, so that the cap 40C and the pivoted portion 31 are held in position.

Since the rear end portion of the aiming screw is exposed on the rear side of the lamp body 2 without being surrounded by the projected wall 12 in the third embodiment of the present invention, like the second embodiment thereof, the work of fitting the cap 40C to the pivoted portion 31 is facilitated.

The repeated description of the other component parts of the third embodiment of the present invention will be omitted with like reference characters given to like component parts of the first embodiment thereof.

Figure 15:
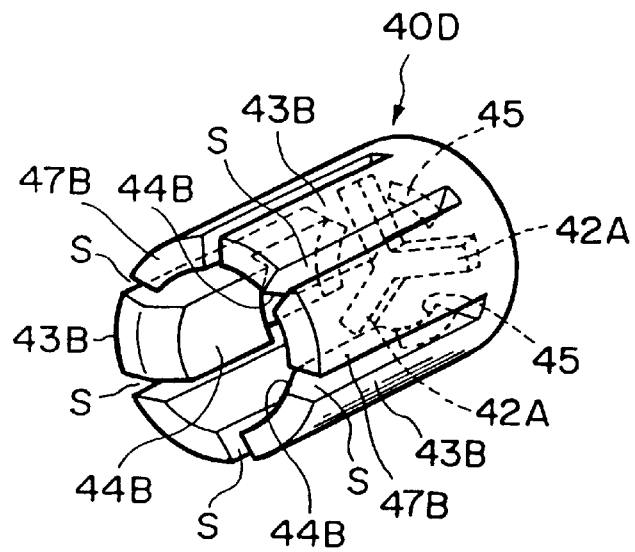
FIG. 15 is a perspective view of a cap as the principal part of a fourth embodiment of the present invention.
Figure 16:
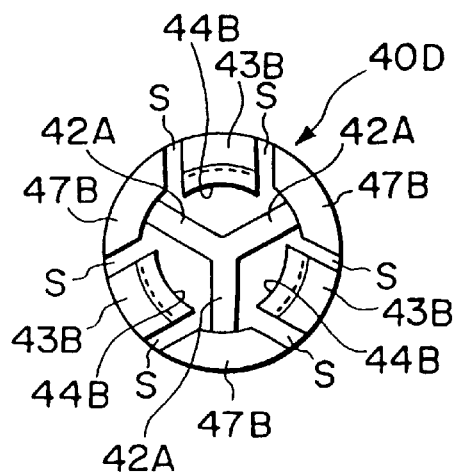
FIG. 16 is an elevational view of the cap.
Figure 17:
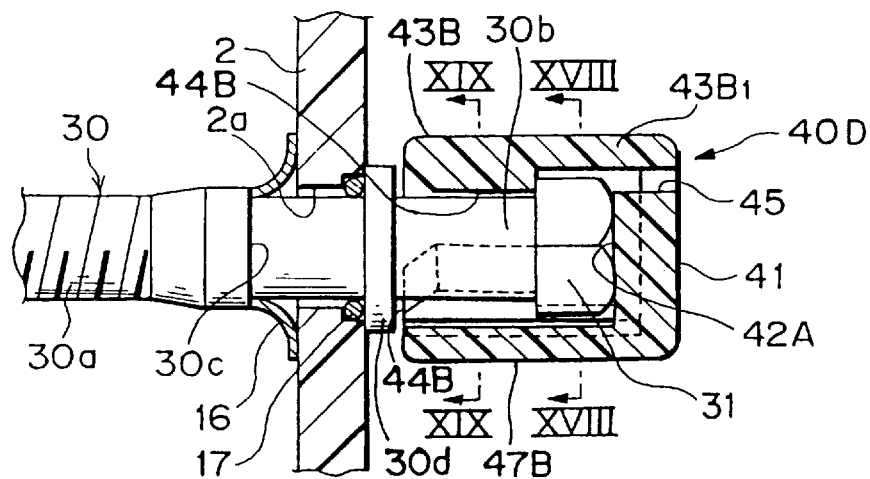
FIG. 17 is a vertical sectional view of the periphery of the pivoted portion fitted with the cap.
Figure 18:
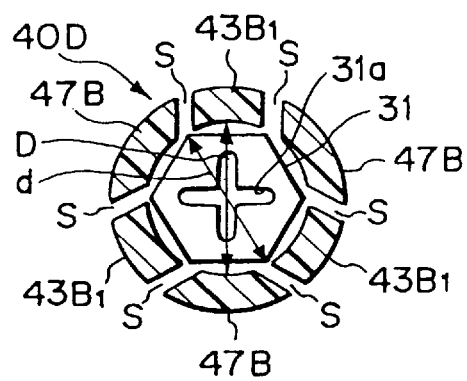
FIG. 18 is a sectional view (taken on line XVIII—XVIII of FIG. 17) of the cap fitted to the pivoted portion.
Figure 19:
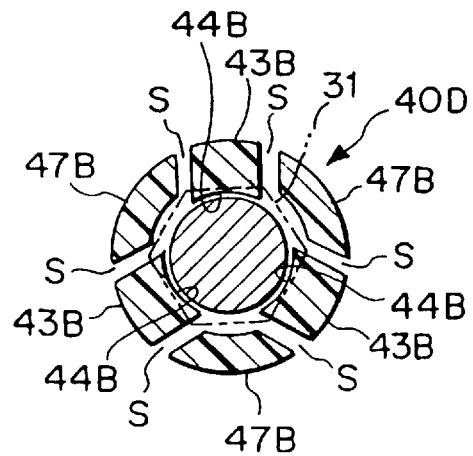
FIG. 19 is a sectional view (taken on line XIX—XIX of FIG. 17) of the cap fitted to the pivoted portion.
Figure 20A:
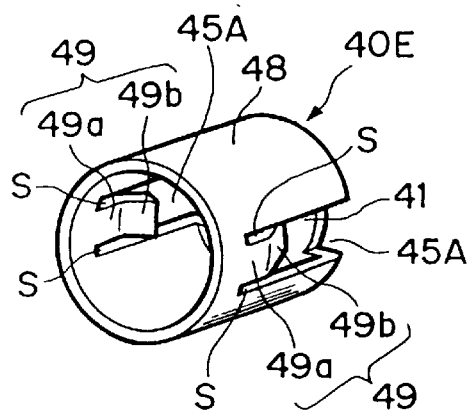
FIG. 20(a) is a perspective view of a cap as the principal part of a fifth embodiment of the present invention.
Figure 20B:
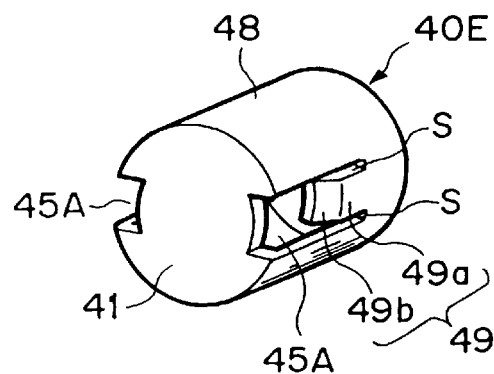
FIG. 20(b) is a perspective view of the cap as viewed from its top portion.

FIGS. 15–19 show the principal parts of a fourth embodiment of the present invention: FIG. 15 is a perspective view of a cap as the principal part of the fourth embodiment thereof; FIG. 16, an elevational view of the cap; FIG. 17, a vertical sectional view of the periphery of the pivoted portion fitted with the cap; FIG. 18, a sectional view (sectional view taken on line XVIII—XVIII of FIG. 17) of the cap fitted to the pivoted portion; and FIG. 19, a sectional view (sectional view taken on line XIX—XIX of FIG. 17) of the cap fitted to the pivoted portion.

In the cap 40C according to the above-described third embodiment of the present invention, its cylindrical portion is formed to size exactly as required to surround only the pivoted portion 31. However, the cylindrical portion (including elastic hooks 43B fitted with pawl portions 44B and contact portions 47B) of a cap 40D in the fourth embodiment of the present invention, is made longer than the cylindrical portion of the third embodiment cap, so that it the cap 40D formed to the size required to surround even the screw shaft portion 30b, as well as the pivoted portion 31.

Since the whole portion (including the pivoted portion 31 and the screw shaft portion 30b) exposed on the rear side of the lamp body 2 of the aiming screw 30 is covered with the cap 40D according to this embodiment of the present invention, it is difficult for the user to touch the aiming screw 30.

Further, the pawl portion 44B provided at the front end of the elastic hook 43B engages with the different-in-level portion 31b on the pivoted portion side in such a way that the cap 40D is fitted to the pivoted portion 31 and functions to prevent the cap 40D from slipping off. The pawl portion 44 is also press-fitted to the screw shaft portion 30b so as to hold the cap 40D on the pivoted portion 31 without backlashing.

The inner diameters D of the thin-walled base portion 43B1 of the elastic hook 43B used to form the cylindrical portion and a contact portion 47B are set greater than the maximum diameter d of the pivoted portion 31, so that when the cap 40D is turned, only the cap 40D is turned idly with respect to the pivoted portion 31.

Reference numeral 42A denotes a rib which is formed on the rear side of the top portion 41 and radially extended to stay away from the opening portion 45. When the rib 42A is brought into contact with the head of the pivoted portion 31, the thin-walled base portion 43B1 of the elastic hook 43B can be lengthened, whereby the cap 40D is smoothly fitted to the pivoted portion 31 as the flexibility of the elastic hook 43B is increased.

Further, no washer is used in the aiming-screw bearing portion in the fourth embodiment of the present invention. More specifically, the flange 30d in the screw shaft portion is, as shown in FIG. 17, kept in direct contact with the O-ring 17 sheathed in the peripheral edge portion of the screw through-hole 2a. Thus, the fourth embodiment of the present invention is so structured so as to exclude the washer 18 used in the screw bearing portion.

The repeated description of the other component parts of the fourth embodiment of the present invention will be omitted with like reference characters given to like component parts of the third embodiment thereof.

Figure 21:
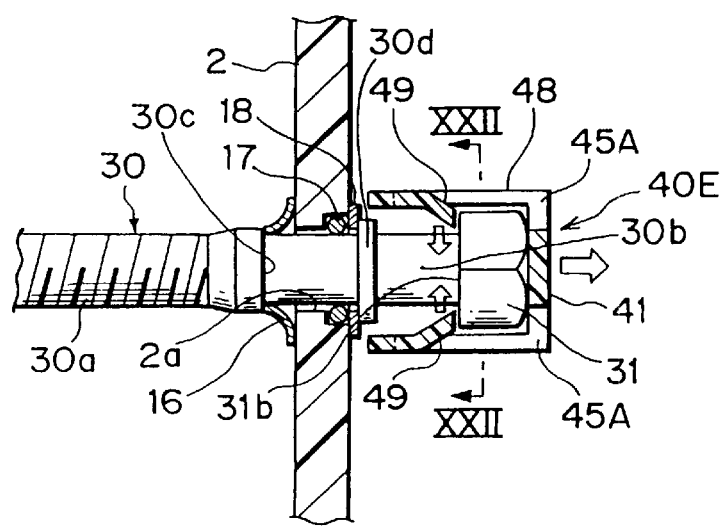
FIG. 21 is a vertical sectional view of the periphery of the pivoted portion fitted with the cap.
Figure 22:
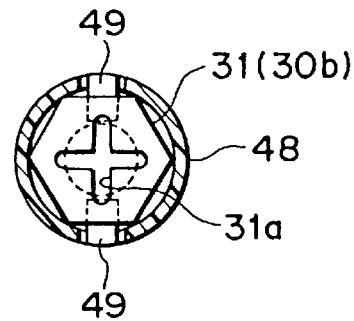
FIG. 22 is a sectional view (taken on line XXI—XXI of FIG. 17) of the cap fitted to the pivoted portion.
Figure 23:
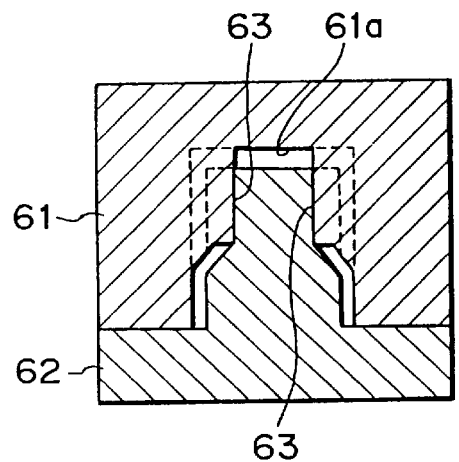
FIG. 23 is a sectional view of a mold for molding the cap.
Figure 24:
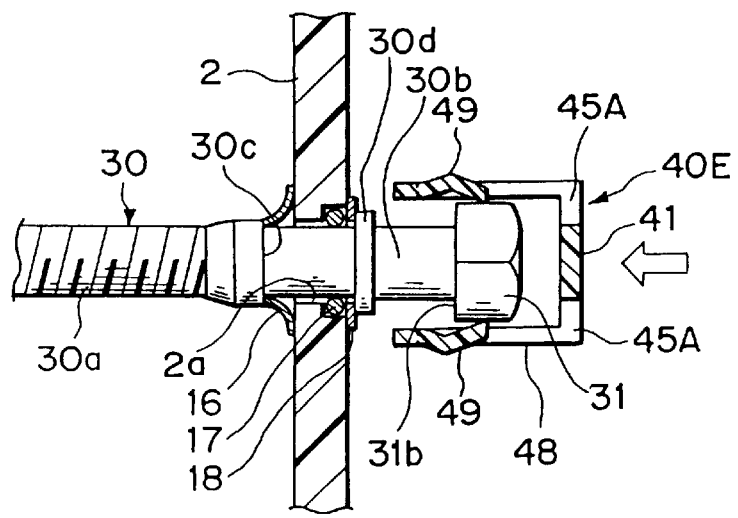

FIGS. 20–24 show the principal parts of a fifth embodiment of the present invention: FIG. 20(a) is a perspective view of a cap as the principal part of the fifth embodiment thereof; FIG. 20(b), a perspective view of the cap as viewed from its head; FIG. 21, a vertical sectional view of the periphery of the pivoted portion fitted with the cap; FIG. 22, a sectional view (sectional view taken on line XXII—XXII of FIG. 21) of the cap fitted to the pivoted portion; FIG. 23, a sectional view of a mold for molding the cap; FIG. 24, a sectional view showing the function of an elastic hook when the cap is fitted thereto.

In the fifth embodiment of the present invention, a cap 40E fitted to the pivoted portion 31 is a plastic closed-end cylindrical body comprising the disc-like top portion 41 for covering the head of the pivoted portion 31, and a cylindrical portion 48 which is perpendicularly extended from the outer peripheral edge of the top portion 41 and used to surround the outside face of the pivoted portion 31, a pair of tongue-like elastic hooks 49 which are prevented from slipping out by engaging with the different-in-level portion 31b on the side of the pivoted portion 31, and being provided in two places at equal intervals in the circumferential direction of the cylindrical portion 48.

More specifically, the pair of opposed tongue-like elastic hooks 49 are formed inside the cylindrical portion 48 in such a way that a part of the side wall forming the cylindrical portion 48 is cut and raised from the head of the cap to the opening portion and extended inward. A slit S is formed between the elastic hook 49 and the side wall in order to increase the flexibility of the tongue-like elastic hook 49, and the cap 40E is held by being fitted to the pivoted portion 31 while the front end portions of the elastic hooks 49 are kept engaged with the different-in-level portion 31b. Moreover, the cap 40E is prevented from backlashing by the way it is fitted to the pivoted portion 31, since the pivoted portion 31 is clamped between the elastic hook 49 and the top portion 41.

Further, the elastic hook 49 is formed in such a way that its region 49a on the base portion side which is extended in parallel to the cylindrical portion 48 axially and straightly is bent halfway and diagonally extended inward to form a "<-shaped" front-end side region 49b, so that the cap is smoothly fitted to the pivoted portion and effectively prevented from slipping out. In other words, due to the fact that the elastic hook 49 is formed in the <-shape, the length ranging from the front end of the hook up to its base (the total length) is made longer than that of a straight hook, which results in increasing the flexibility of the hook, thus making it possible to fit the cap 40E to the pivoted portion 31 smoothly. Moreover, the <-shaped hook is highly effective for preventing the cap 40E from slipping out because the elastic hook 49 undergoes elastic deformation toward the inner radial direction along the different-in-level portion 31b on the pivoted portion side when the cap 40E is pulled in the direction in which it is pulled out of the pivoted portion 31.

The inner diameter of the cap 40E (cylindrical portion 48) is set greater than the maximum outer diameter of the pivoted portion 31 and when the cap 40E is turned, only the cap 40E is idly turned with respect to the pivoted portion 31.

The cylindrical portion 48 is set long enough so that the end portion on the opening side is positioned close to the lamp body 2 in such a state that the cap 40E has been fitted to the pivoted portion 31. Consequently, even the screw shaft portion, as well as the pivoted portion 31, is securely surrounded with the cylindrical portion 48 (cap 40E). Therefore, according to this embodiment of the present invention, no pivoted tool can be made to engage with the pivoted portion 31, and even the presence of the pivoted portion 31 is made unrecognizable.

Reference numeral 45A denotes an opening portion which is formed in a position corresponding to what ranges from the top portion 41 up to the cylindrical portion 48 and corresponds to a mold projection 63 (see FIG. 23) for molding the surface side of the elastic hook 49 that may become an undercut when the cap is molded.

In other words, the cap 40E is, as shown in FIG. 23, molded by a pair of opposed molds comprising a first mold 61 for molding the outside of the cap and a second mold 62 for molding the inside of the cap. The mold projection 63 for molding the surface side of the elastic hook 49 is formed on the molding face 61a of the first mold 61.

In order to fit the cap 40E to the pivoted portion 31, the flexibility of the elastic hooks 49 may be utilized for fitting the cap 40E to the pivoted portion 31 with one movement. More specifically, as shown by an arrow of FIG. 24, when the opening side of the cap 40E is press-fitted to the pivoted portion 31, the elastic hooks 49 are expanded by the head of the pivoted portion 31 and made to slide along the outside face of the head and as shown in FIG. 21, and the elastic hooks 49 engage with the different-in-level portion 31b, so that the cap 40E is prevented from slipping out.

In the aforesaid embodiments 1–5 of the present invention, the pivoted portions 21, 31 are respectively provided in the rear end portions of the aiming screws 20, 30 and have hexagon heads with the cross slots 21a, 31a formed in their edge faces which are used for mating with a plus screwdriver.

Figure 25:
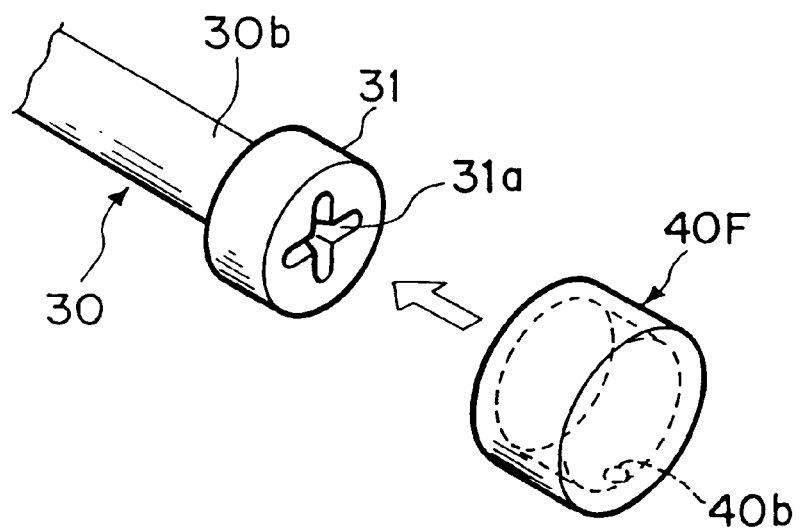
FIG. 25 is a perspective view of a cap and a pivoted portion as the principal parts of a sixth embodiment of the present invention.
Figure 26:
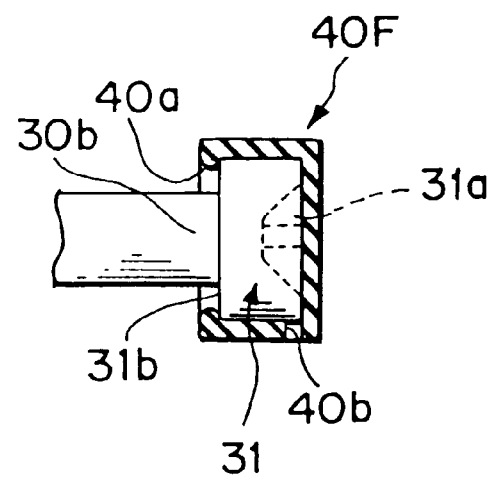
FIG. 26 is a vertical sectional view of the periphery of the pivoted portion fitted with the cap.

FIGS. 25 and 26 show the principal part of a sixth embodiment of the present invention: FIG. 25 is a perspective view of a cap as the principal part of the sixth embodiment thereof; and FIG. 26, a vertical sectional view of the cap fitted to a horizontal aiming screw.

The pivoted portion 31 in the sixth embodiment of the present invention is so structured that a cross slot 31a is formed in the head of its columnar head portion whose diameter is greater than that of a screw shaft, whereby a cup-like rubber cap 40F can be fitted tightly to the pivoted portion 31 by utilizing its elasticity (flexibility).

Reference numeral 40a denotes a rib which is circumferentially provided on the inside of the peripheral edge of the opening portion of the cap 40F, and which is prevented from slipping out as the rib 40a engages with the different-in-level portion 31b on the pivoted portion side.

Reference numeral 40b denotes a vent hole provided in the side face of the cap 40F and when the cap 40F is fitted to the pivoted portion 31, the air inside the cap is discharged through the hole 40b so as to smooth the work of fitting the cap 40F thereto.

Figure 27:
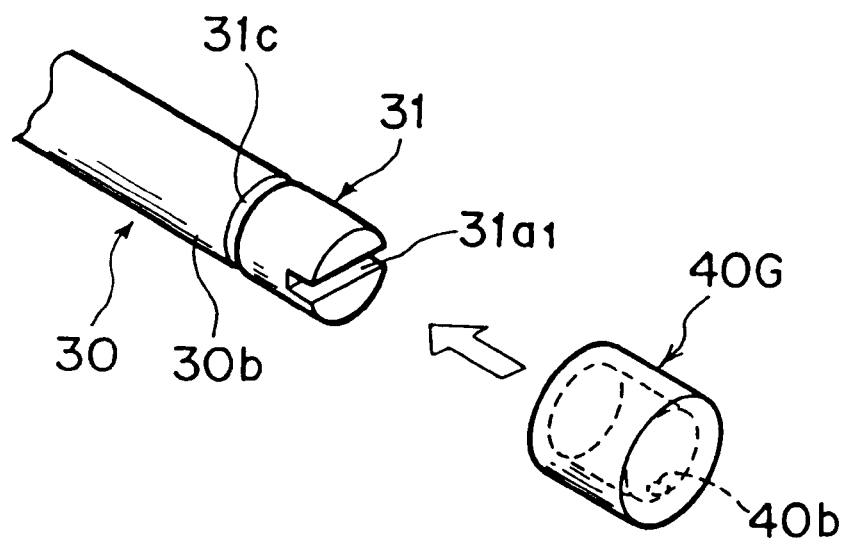
FIG. 27 is a perspective view of a cap and a pivoted portion as the principal parts of a seventh embodiment of the present invention.
Figure 28:
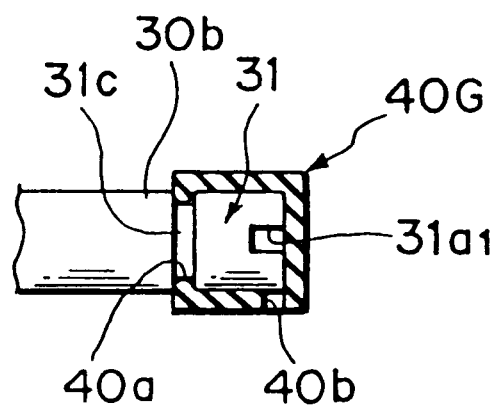
FIG. 28 is a vertical sectional view of the periphery of the pivoted portion fitted with the cap.

FIGS. 27 and 28 shows a seventh embodiment of the present invention: FIG. 27 is a perspective view of the principal part of the seventh embodiment thereof; and FIG. 28, a vertical sectional view of the cap fitted to a horizontal aiming screw.

The pivoted portion 31 in the seventh embodiment of the present invention is so structured that a minus slot 31a1 for engaging with a minus screwdriver is formed in the edge face of the screw shaft portion 30b, whereby a cup-like rubber cap 4OG can be fitted tightly to the pivoted portion 31. Reference numeral 31c denotes a slot circumferentially made in the outer peripheral face of the screw shaft portion as a different-in-level portion on the pivoted portion side. The rib 40a circumferentially provided on the inside of the peripheral edge of the opening portion of the cap 40G engages with the slot 31c to prevent the cap 40G from slipping out.

The repeated description of the other component parts of the seventh embodiment of the present invention will be omitted with like reference characters given to like component parts of the sixth embodiment thereof.

Figure 29:
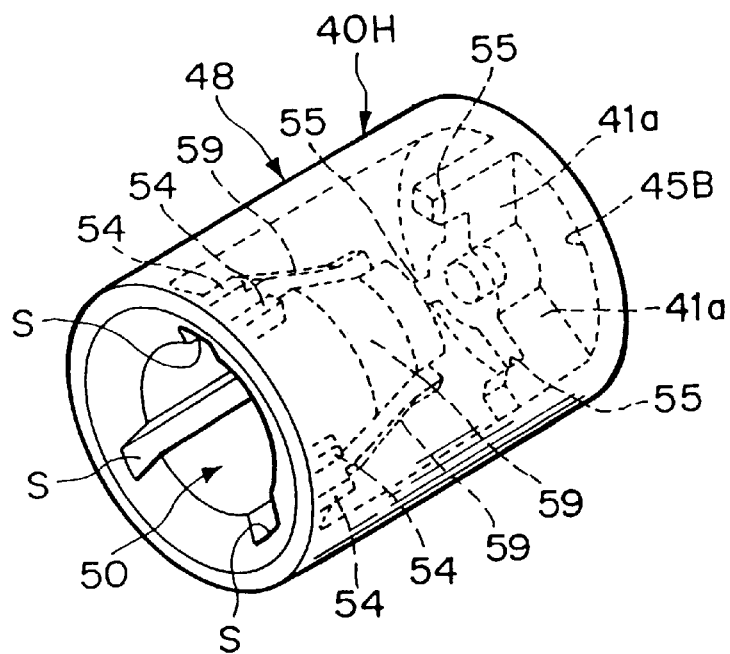
FIG. 29 is a perspective view of a cap as the principal part of an eighth embodiment of the present invention.
Figure 30:
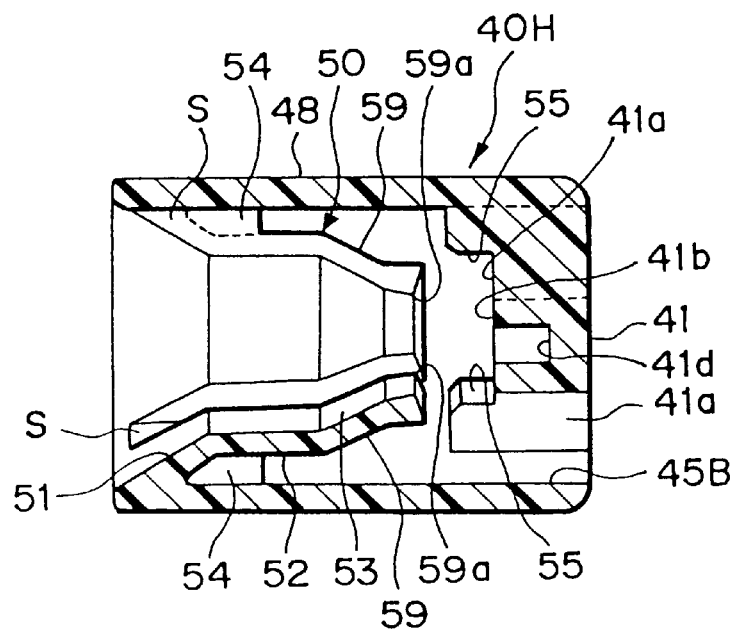
FIG. 30 is a vertical sectional view (taken on line XXX—XXX of FIG. 31) of the cap.
Figure 31:
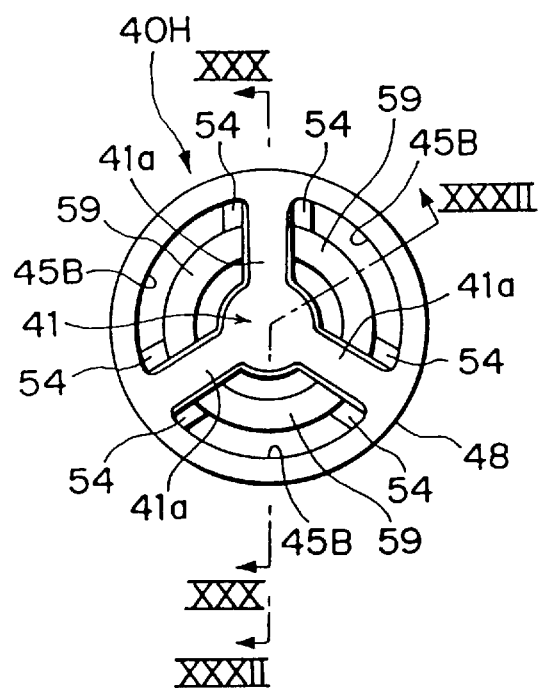
FIG. 31 is an elevational of the cap.
Figure 32:
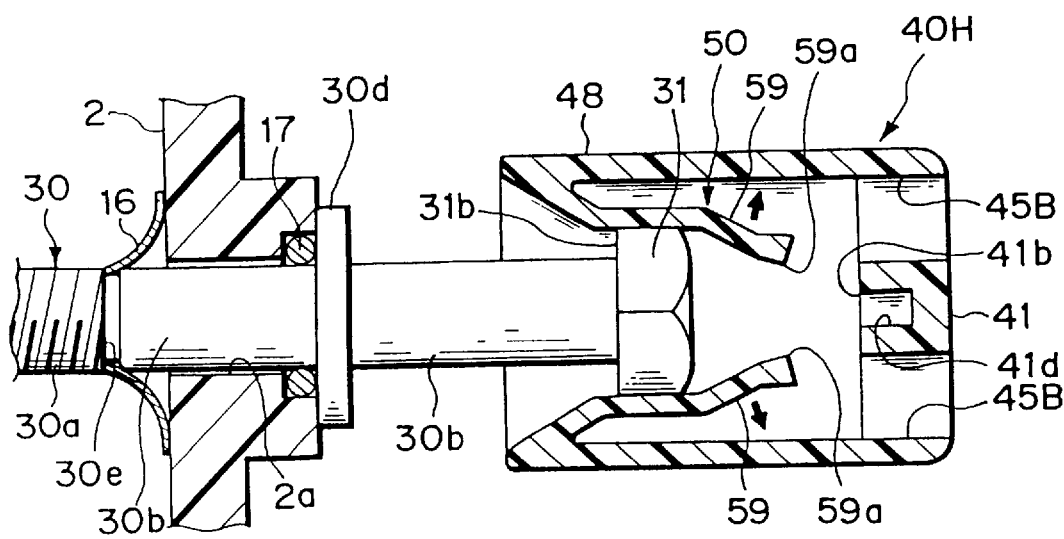
Figure 33:
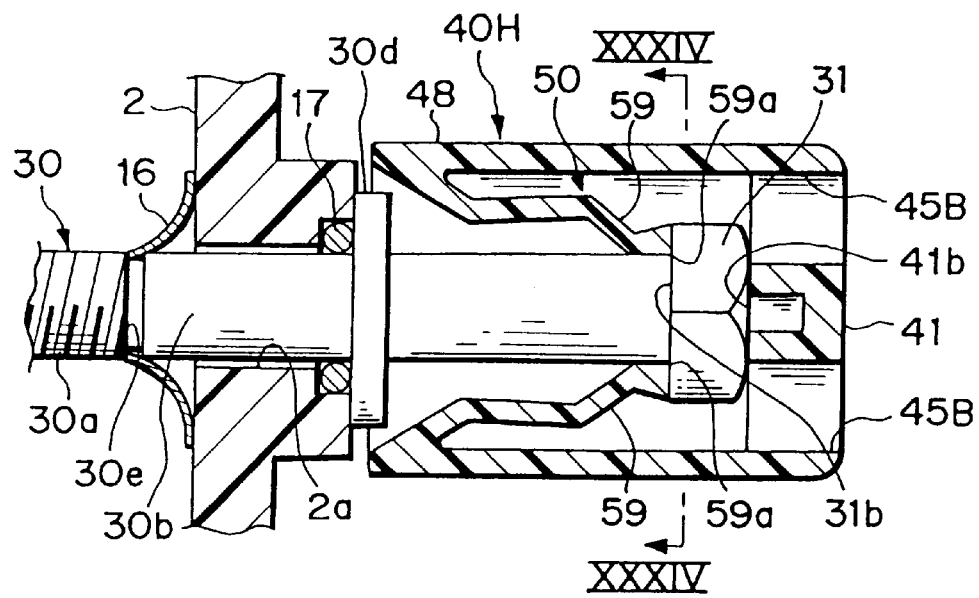
FIG. 33 is a vertical sectional view of the periphery of the pivoted portion fitted with the cap.
Figure 34:
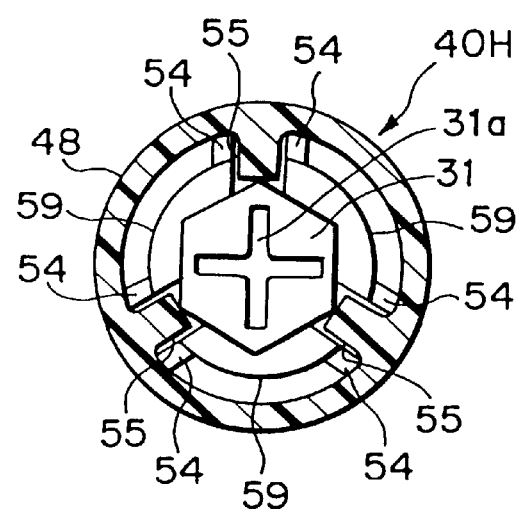
FIG. 34 is a transverse sectional view (taken on line XXXIV—XXXIV of FIG. 33) of the cap.

FIGS. 29–34 show the principal part of an eighth embodiment of the present invention: FIG. 29 is a perspective view of a cap as the principal part of the eighth embodiment thereof; FIG. 30, a vertical sectional view (sectional view taken on line XXX—XXX of FIG. 31) of the cap; FIG. 31, an elevational view of the cap; FIG. 32, a sectional view (sectional view taken on line XXXII—XXXII of FIG. 31) explanatory of the function of the elastic hooks when the cap is fitted; FIG. 33, a vertical sectional view of the periphery of the pivoted portion fitted with the cap; and FIG. 34, a transverse sectional view (sectional view taken on line XXXIV—XXXIV of FIG. 33) of the cap.

A cap 40H in the eighth embodiment of the present invention is an improved version of the cap 40E in the fifth embodiment thereof and structured to ensure that the cap is smoothly fitted to the pivoted portion; and the cap thus fitted thereto is prevented from not only slipping out, but also backlashing. A detailed description will subsequently be given of these features.

The cap 40H is a closed-end cylindrical body having the top portion 41 covering the head of the pivoted portion 31, and the cylindrical portion 48 perpendicularly extended from the outer peripheral edge of the top portion 41 and used to surround the outside face of the pivoted portion 31. Three tongue-like elastic hooks 59 are provided in such a way that they are prevented from slipping out by engaging with the different-in-level portion 31b on the side of the pivoted portion 31.

An inner cylindrical portion 50 in the form of a stepped cylinder connected to the lower end of the cylindrical portion 48 and extended upward along the cylindrical portion 48 is formed inside the cylindrical portion 48 of the cap. The inner cylindrical portion 50 is structured to have a tilting tapered base portion 51 whose diameter is gradually decreased, a straight portion 52 having an equal diameter and a tilting tapered front end portion 53 whose diameter is gradually decreased. A vertical slit S is provided in three places at equal intervals in the circumferential direction of the inner cylindrical portion 50, and the extended end side of the inner cylindrical portion is divided into three tongue-like elastic hooks 59 in a "<-shaped" form in vertical cross section.

In the top portion 41 of the cap 40H, there is formed an opening portion 45B corresponding to a mold projection for molding the outside (the side facing the cylindrical portion 48) of each elastic hook 59 as an undercut when the cap 40H is molded, and the opening portion is a region corresponding to the opening portion 45A of the cap 40E in the fifth embodiment of the present invention. Further, a horizontal rib radially extending to separately form an opening portion 45B is formed in a position corresponding the vertical slit S of the top portion 41. Reference numeral 41d denotes a recess for stopping the generation of a sinkage in the top portion 41.

The formation of the vertical slit S ranges from the tilting tapered front end portion 53 up to the titling tapered base portion 51 to give sufficient flexibility to the elastic hook 53. A region ranging from both tilting tapered base portions 51 up to the midpoint of the straight portion 52 is consecutively connected to the cylindrical portion 48 by means of a vertical wall 54 to secure the rigidity of the elastic hook 59.

This elastic hook 59 like the elastic hook 49 of the cap 40 in the fifth embodiment of the present invention is also prevented from slipping out by elastically engaging with the different-in-level portion 31b of the pivoted portion 31. However, the width of the elastic hook 59 is greater than that of the elastic hook 49 and since the elastic hook 59 is provided in three places at equal intervals in the circumferential direction, the effect of preventing the elastic hooks from slipping out is greater than that of the case of the cap 40E in the fifth embodiment of the present invention.

The inner diameter of the straight portion 52 of the elastic hook 59 is formed so that it matches the outer diameter of the pivoted portion 31, and the straight portion 52 functions as a guide when the cap 40H is fitted to the pivoted portion 31. In other words, the straight portion 52 is in such a state that it has engaged with the pivoted portion 31 as shown in FIG. 32 when the cap 40H is fitted to the pivoted portion 31. When the cap 40H is pushed inward in this state, the elastic hook 59 undergoes elastic deformation outward as shown by arrows of FIG. 32 and the front end portion 59a of the elastic hook 59 engages with the different-in-level portion 31b of the pivoted portion 31, so that the cap is fitted to the pivoted portion (see FIG. 33).

Thus, the straight portion 52 engaging with the pivoted portion 31 automatically causes the cap 40H and the pivoted portion 31 to be positioned with their axes conforming with each other. Therefore, it is only necessary to push the cap 40H in to ensure that the cap 40H is simply fitted to the pivoted portion 31.

The inside of the front end portion 59a of the elastic hook 59 is formed such that it is perpendicular in vertical cross section, and when the cap 40H is fitted to the pivoted portion 31, it is press-fitted to the perpendicular branch portion between the screw shaft portion 30b and the different-in-level portion 31b. Further, the thickness of the plate of the front end portion 59a of the elastic hook 59 is increased toward its front end side so that the contact area with respect to the different-in-level portion 31a of the pivoted portion 31 is great, whereby backlashing is hardly caused between the cap 40H and the pivoted portion 31.

A vertical rib 55, consecutively connected to the horizontal rib 41a, is provided in the region between the top portion 41 on the inner peripheral face of the cylindrical portion 48 of the cap and the elastic hook 59, so as to obviate the backlashing in between the cap 40H and the pivoted portion 31. In other words, the vertical rib 55 is consecutively connected to the three horizontal ribs 55 radially extending in the top portion 41, and the inner peripheral face is formed into a cylindrical shape matching the maximum outer diameter of the pivoted portion 31, thus allowing the cap 40H to idly rotate around the pivoted portion 31. When the hexagonal angular portion of the pivoted portion 31 is so positioned as to positively face the vertical rib 55 in particular, the cap 40H is prevented from backlashing with respect to the pivoted portion 31 to the extent that the pivoted portion 31 is supported by the vertical ribs 55 in the three places on the outer periphery thereof.

When the cap 40H is fitted to the pivoted portion 31, the inside of the front end portion (tilting tapered base portion 51 of the inner cylindrical portion 50 of the cap) of the cylindrical portion 48 of the cap 40H is set extremely close to the flange 30d of the screw shaft portion 30b. When the cap 40H is tilted, the tilting tapered base portion 51 is brought into contact with the flange 30d and stopped from tilting, so that the cap 40H is prevented from backlashing with respect to the pivoted portion 31.

In FIGS. 32, 33, an annular groove 30e is formed in the aiming screw 30, and the push-on-fix 16 is placed between the groove 30e and the peripheral edge portion of the screw through-hole 2a, whereby the aiming screw 30 is prevented from slipping out.

Figure 35:
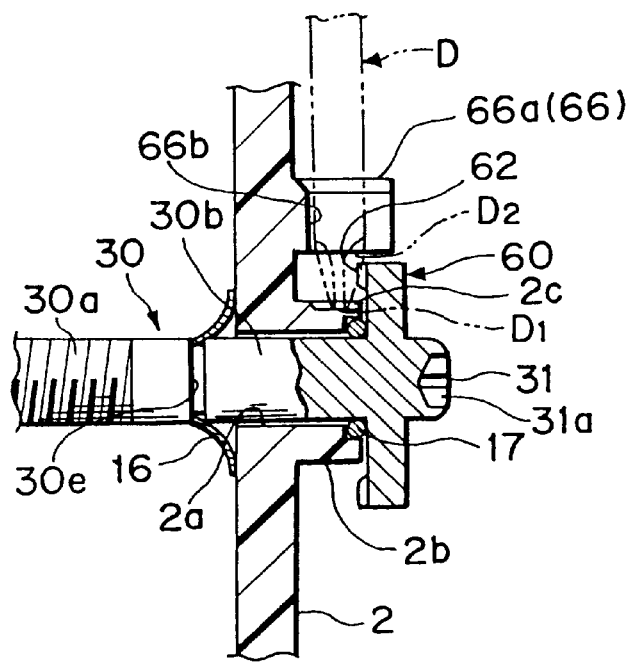
FIG. 35 is a vertical sectional view of the periphery of the pivoted portion of the aiming screw as the principal part of a ninth embodiment of the present invention.
Figure 36:
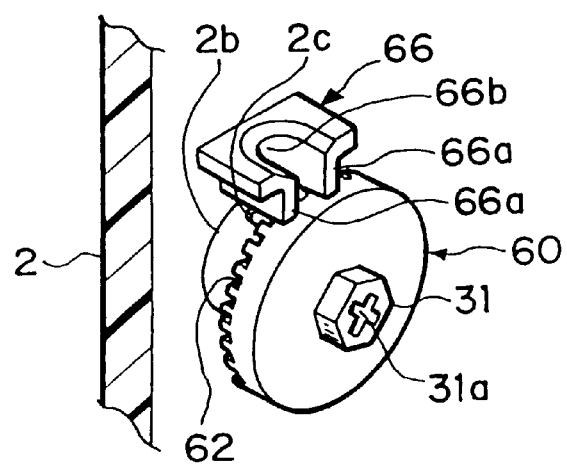
FIG. 36 is a perspective view of the periphery of the pivoted portion of the horizontal aiming screw.
Figure 37:
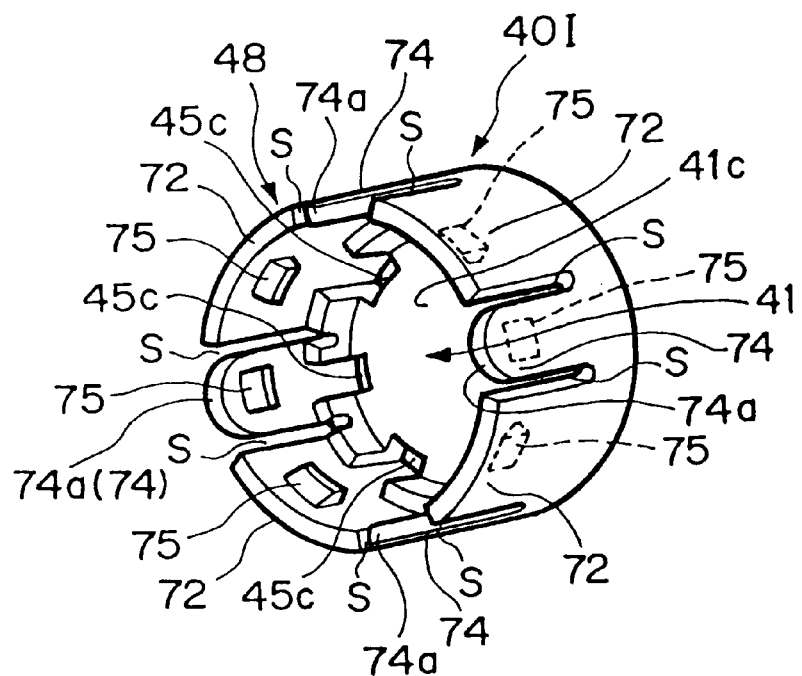
FIG. 37 is a perspective view of the cap.
Figure 38:
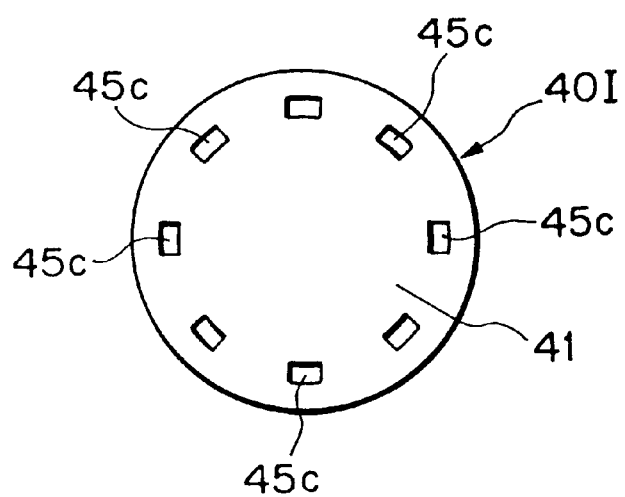
FIG. 38 is an elevational view of the cap.
Figure 39:
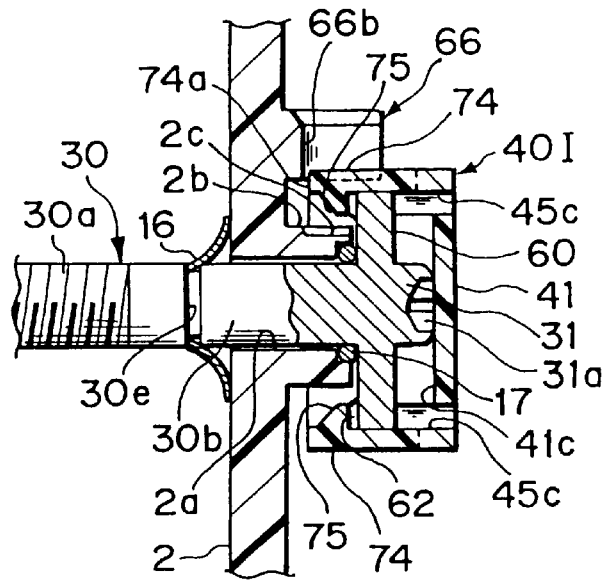
FIG. 39 is a vertical sectional view of the periphery of the pivoted portion of the horizontal aiming screw fitted with the cap.
Figure 40:
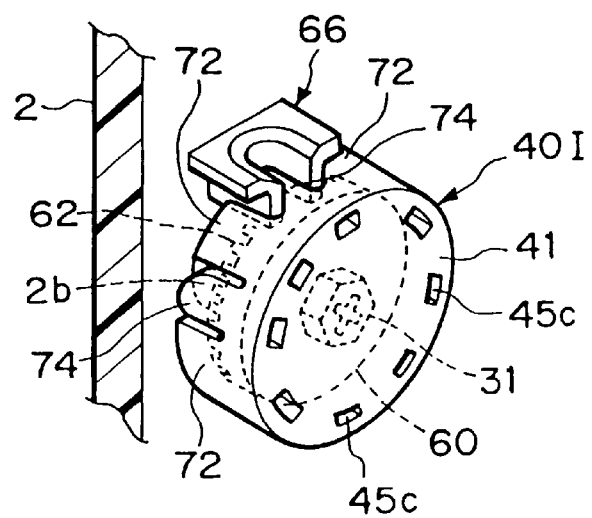
FIG. 40 is a perspective view of the periphery of the pivoted portion of the horizontal aiming screw fitted with the cap.

FIGS. 35–40 show the principal part of a ninth embodiment of the present invention: FIG. 35 is a vertical sectional view of the periphery of the pivoted portion of an aiming screw as the principal part of the ninth embodiment thereof; FIG. 36, a perspective view of the periphery of the pivoted portion of a hexagon aiming screw; FIG. 37, a perspective view of a cap; FIG. 38, an elevational view of the cap; FIG. 39, a vertical sectional view of the periphery of the pivoted portion of the horizontal aiming screw fitted with the cap; and FIG. 40, a perspective view of the periphery of the pivoted portion of the horizontal aiming screw fitted with the cap.

Although the pivoted portion provided in the rear end portion of the aiming screw has been formed with the hexagon bolt head and/or the cross slot in the first–eighth embodiments of the present invention, a pivoted portion with a bevel gear 60 is proved in the rear end portion of an aiming screw (vertical aiming screw 20 and horizontal aiming screw 30). Thus, the vertical aiming screw 20 is kept rotatable by employing a cap 40I for covering the bevel gear 60 as a pivoted portion in the rear end portion of the horizontal aiming screw, whereas the horizontal aiming screw 30 is not allowed to rotate in order to make this structure fit the U.S. specification.

As shown in FIG. 35, the horizontal aiming screw 30 incorporating the bevel gear 60 as the pivoted portion of the screw shaft portion 30b is passed through a cylindrical bearing 2b which is projected along the screw through-hole 2a of the lamp body 2 and rotatably supported as it is prevented from slipping out by the push-on-fix 16.

The toothed portion 62 of the bevel gear 60 is directed to the lamp body 2, and right above the bearing 2b lies a two-way driver guide 66 which is incorporated in the lamp body 2. Further, the plus screwdriver D inserted from above and along the lamp body 2 is guided by the driver guide 66, and when the front end D1 is brought into contact with the bearing 2b, the teeth D2 of the screwdriver D automatically engage with the toothed portion 62 of the bevel gear 60. Then the horizontal aiming screw 30 can be turned via the bevel gear 60 by turning the screwdriver D guided by the driver guide 66; that is, the horizontal aiming screw is made adjustable.

Reference numeral 2c denotes a recess which is positioned positively opposite to the driver guide 66 on the outer peripheral face of the bearing 2b and extended axially. When the front end D1 of the screwdriver D engages with the recess 2c, the front end D1 of the screwdriver is placed in position without sliding in the circumferential direction of the bearing 2b.

The pivoted portion 31 incorporating a hexagon bolt head with the cross slot 31a is formed in the center of the edge face of the bevel gear 60, so that the aiming screw 30 can be turned by using a spanner or a wrench, or by making the screwdriver D engage with the cross slot 31a.

The structure of the vertical aiming screw 20 is the same as the aforesaid hexagonal aiming screw and since the structure of the headlamp is also the same as that of the headlamp in the first embodiment of the present invention, the description of these will be omitted.

A cap 40I (see FIGS. 37–40) is a closed-end cylindrical body comprising the top portion 41 covering the edge face of the bevel gear 60, and the cylindrical portion 48 is extended perpendicularly from the outer peripheral edge of the top portion 41 and used to surround the outside faces of the bevel gear 60. The cylindrical portion 48 is divided by eight vertical slits S into four wide tongue-like elastic hooks 72 installed at equal intervals in the circumferential direction, and four narrow tongue-like elastic hooks 74 installed at equal intervals in the circumferential direction, the elastic hooks 72 and 74 being alternately and consecutively connected in the circumferential direction.

Pawls 75 that can be brought into contact with the front edge portion of the toothed portion of the bevel gear 60 are projected from the respective insides of the elastic hooks 72, 74, whereby the elastic hooks 72, 74 can grip the outside face of the bevel gear 60.

A recess 41c large enough to contain the pivoted portion 31 is formed in the rear side of the top portion 41, and the narrow tongue-like elastic hook 74 is formed to size matching the inner width of the driver guide 66. The slit-S is also formed to size matching the plate thickness of the vertical wall 66a of the driver guide 66.

When the cap 40I is press-fitted from the edge face side of the bevel gear 60 in such a way that one of the narrow elastic hooks 74 engages with the driver guide 66, the elastic hooks 72, 74 are expanded outward by the outside face of the bevel gear 60, and the pawl 75 slides on the outside face of the bevel gear 60, and is brought into contact and engages with the front edge portion of the toothed portion 62 and is prevented from slipping out. Thus, the cap 40I is kept being fitted to the bevel gear 60.

The cap 40I is fitted to the bevel gear 60, and the elastic hook 74 is kept engaged with the driver guide 66 and the rotation of the cap 40I is stopped.

The front end portion 74a of the elastic hook 74 is made arcuate in conformity with the arcuate shape of the inner periphery of the base portion 66b of the driver guide 66 and when the cap 40I is fitted to the bevel gear 60, the front end portion 74a of the elastic hook 74 is extended up to the base portion 66b of the driver guide 66, whereby it becomes difficult to let the screwdriver D engage with the toothed portion 62 of the bevel gear 60. Since the whole periphery of the bevel gear 60 including the inside of the driver guide 66 is covered with the cap 40I, dust and water is prevented from penetrating into the bearing portion of the aiming screw 30.

Reference numeral 45C denotes an opening made in a position corresponding to the pawl 75 of the top portion 41 of the cap 40H or the opening corresponding to the mold projection for forming the pawl 75 as an undercut when the cap 40H is molded, the opening being made in the position corresponding to the opening 45A of the cap 40E in the fifth-embodiment of the present invention.

Figure 41:
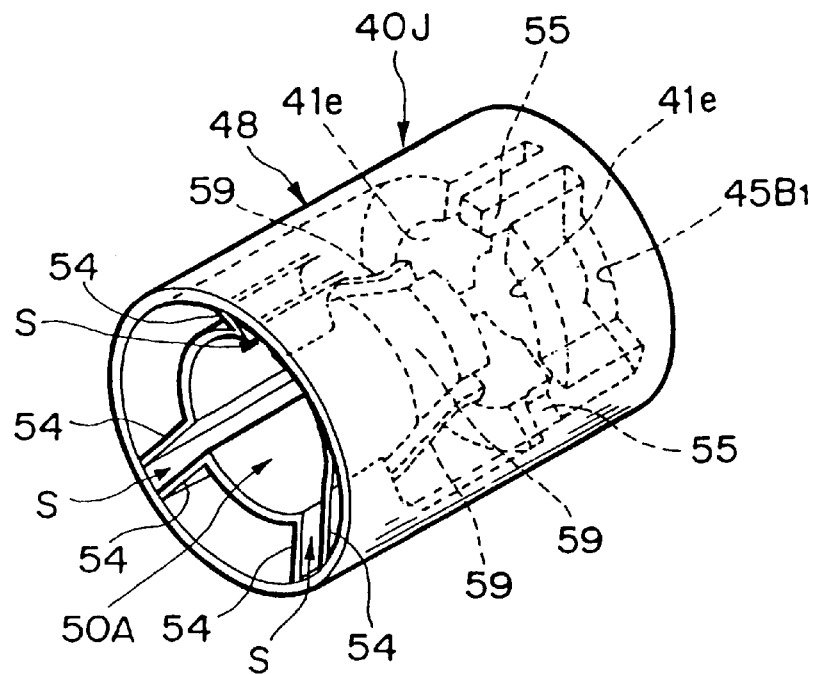
FIG. 41 is a perspective view of a cap as the principal part of a tenth embodiment of the present invention.
Figure 42:
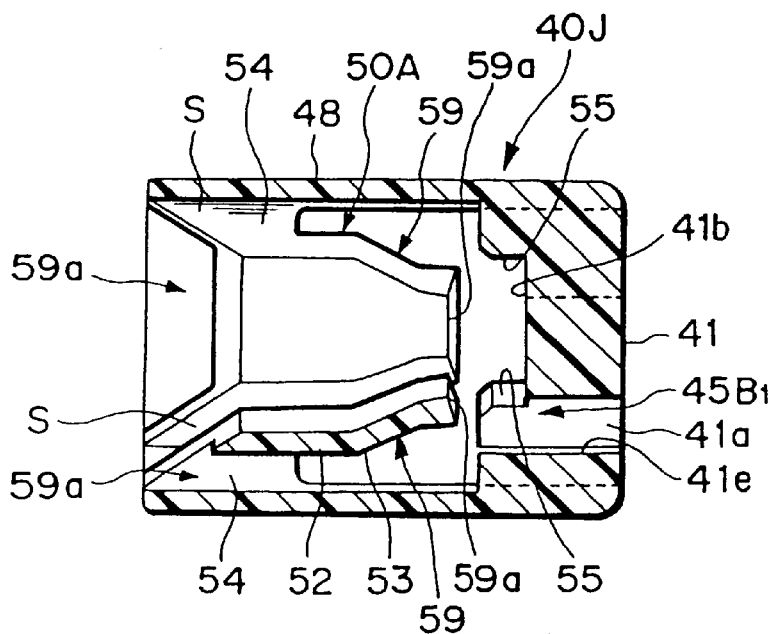
FIG. 42 is a vertical sectional view (taken on line XXXXII—XXXXII of FIG. 43) of the cap.
Figure 43:
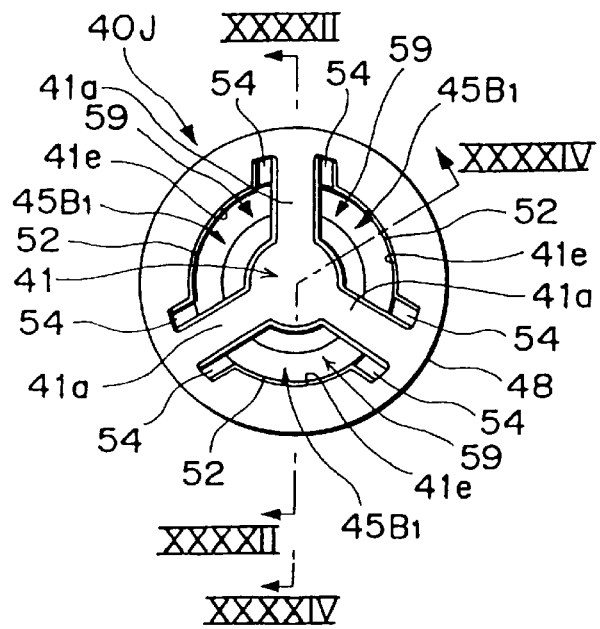
FIG. 43 is an elevational view of the cap.
Figure 44:
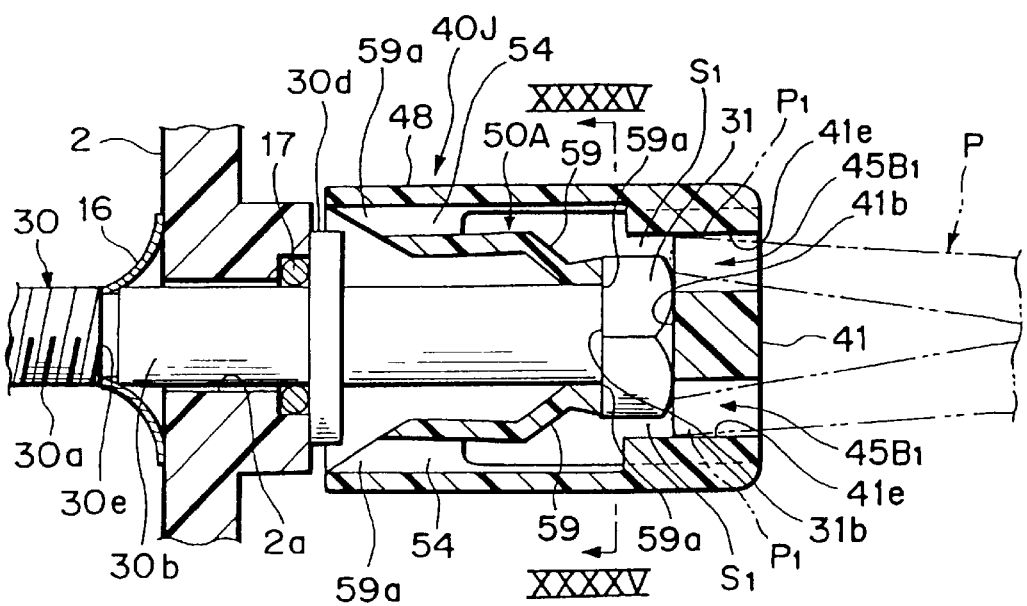
FIG. 44 is a vertical sectional view of the periphery of the pivoted portion of the horizontal aiming screw fitted with the cap.
Figure 45:
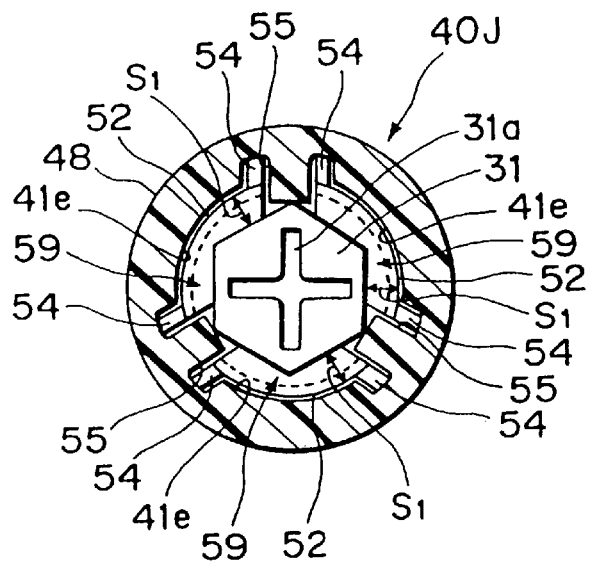
FIG. 45 is a transverse sectional view (taken on line XXXXV—XXXXV of FIG. 44) of the cap.
Figure 46:
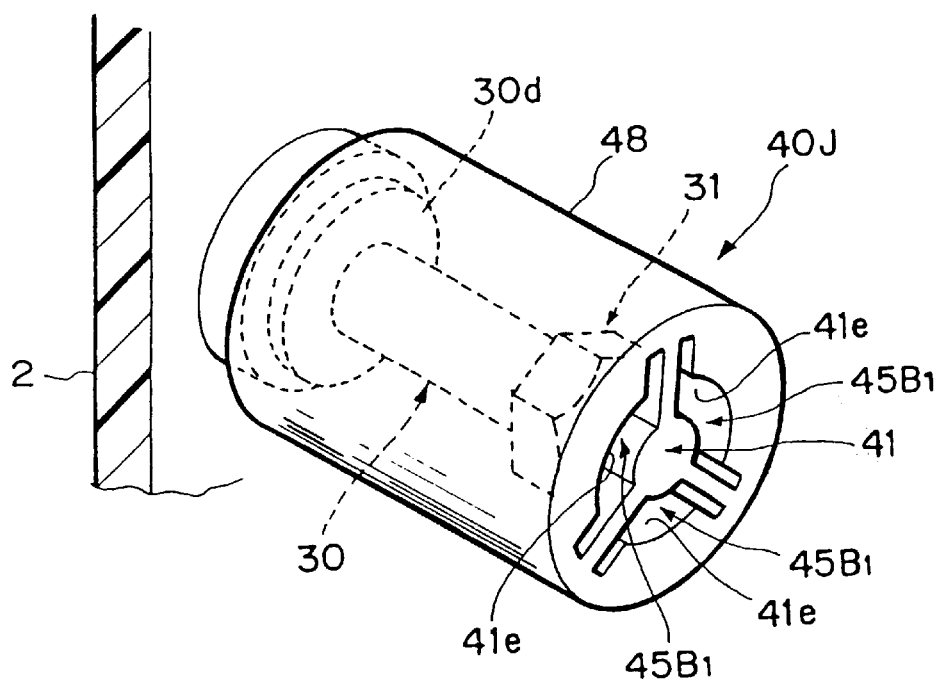
FIG. 46 is a perspective view of the cap fitted to the pivoted portion.

FIGS. 41–47 show the principal part of a tenth embodiment of the present invention: FIG. 41 is a perspective view of a cap as the principal part in the tenth embodiment of the present invention; FIG. 42, a vertical sectional view (sectional view taken on line XXXXII—XXXXII of FIG. 43) of the cap; FIG. 43, an elevational view of the cap; FIG. 44, a vertical sectional view (sectional view taken on line XXXXIV—XXXXIV of FIG. 43) of the periphery of the pivoted portion of the horizontal aiming screw fitted with the cap; FIG. 45, a transverse sectional view (sectional view taken on line XXXXV—XXXXV of FIG. 44) of the cap; FIG. 46, a perspective view of the cap fitted to the pivoted portion; and FIG. 47, a sectional view of a mold for molding the cap.

A cap 40J in the tenth embodiment of the present invention is an improved version of the cap 40H in the eighth embodiment thereof shown in FIGS. 29–34, wherein an inner projection 41e is formed on the top portion 41 of the cap, and an opening portion 45B1 is set narrower than the opening portion 45B of the cap 40H in the eighth embodiment thereof. The tenth embodiment of the present invention is different from the eighth embodiment thereof in that the former is structured so that it is difficult to turn the pivoted portion 31 by inserting radial pliers P from the opening portion 45B1, and the rest including the cap 40H is the same in construction as in the eighth embodiment thereof. Therefore, only what is different from the cap 40H will mainly be described and the repeated description of the main component parts of the cap 40J will be omitted with like reference characters given to like component parts of the cap 40H.

More specifically, in the case of the cap 40H in the eighth embodiment of the present invention, a potential problem occurs in that the radial pliers P inserted from the opening 45B, may clamp the bolt head 31 in the cap 40H and turn it (aiming screw 30). According to this embodiment of the present invention, however, the arcuate inner projection 41e is formed on the inner peripheral face of the cylindrical portion 48 corresponding to the opening 45B1 and the opening 45B1 is narrowed in the radial direction (e.g., the gap between the outer peripheral edge of the top portion 41 and the inner peripheral edge of the inner projection 41e in the radial direction is set at about 3 mm), so that the radial pliers P are difficult to insert into the opening 45B1.

Moreover, the inner projection 41e is extended to face the outside face of the bolt head 31 of the cap 40J and as shown in FIGS. 44, 45, the gap S between the bolt head 31 and the inner projection 41e is narrowed, so that the front end P1 of the radial pliers is difficult to insert into the gap S1 (difficult to clamp the bolt head 31 with the pliers P).

When it is attempted to open the front end P1 of the pliers inserted into the opening 45B1, the front end P1 of the pliers is brought into contact with the inner projection 41e and the front end P1 of the pliers cannot be widened greater than the outer diameter of the bolt head 31. Consequently, the bolt head itself is difficult to grip with the pliers P.

Thus, according to this embodiment of the present invention, the aiming screw 30 cannot be turned entirely when the cap 40J is fitted to the pivoted portion 31.

In order to prevent the outer peripheral region of the inner cylindrical portion 50A formed inside the cylindrical portion 48 of the cap from becoming an undercut, the front side of the base portion of the elastic hook 59 is left open. Reference numeral 59a denotes an opening portion. In other words, the formation of the inner projection 41b (see also FIGS. 30, 32) on the top portion 41 of the cap 40J results in forming the region between the elastic hook 59 inside the cylindrical portion 48 and the inner projection 41e into an undercut at the time of injection molding, using a mold, and makes it difficult to mold the cap unless the inner cylindrical portion 50A is the same in structure (the base side of the elastic hook 59 is closed) as the inner cylindrical portion 50 in the cap 40H as shown in the eighth embodiment of the present invention.

Figure 47:
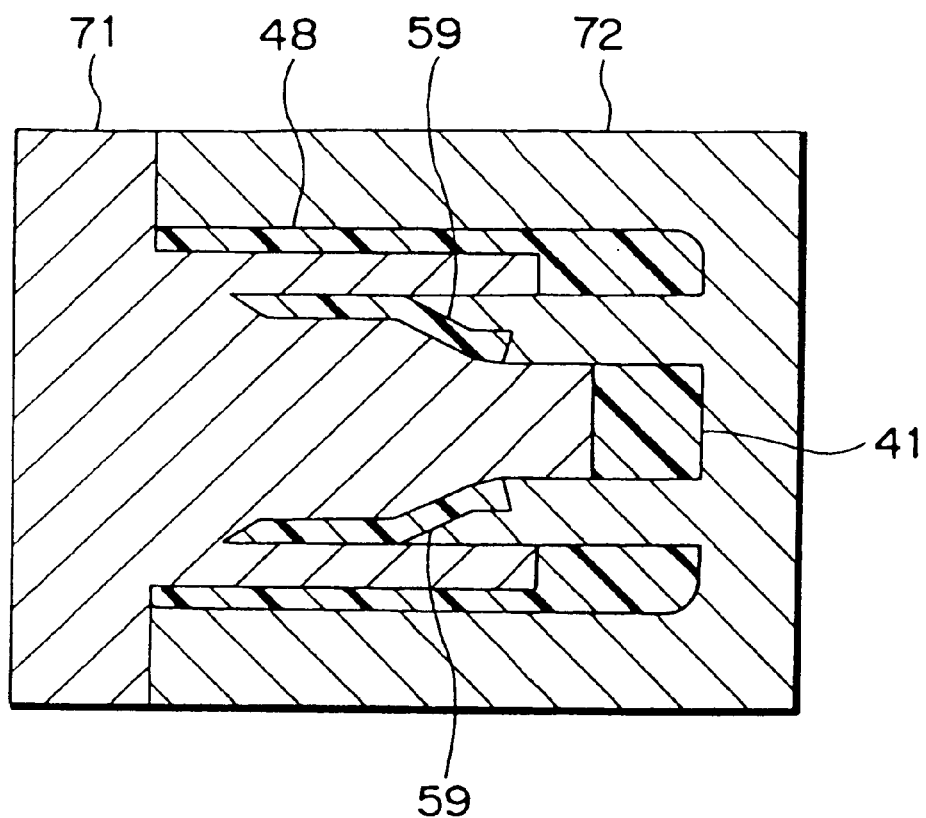
FIG. 47 is a sectional view of a mold for molding the cap.
Figure 48:
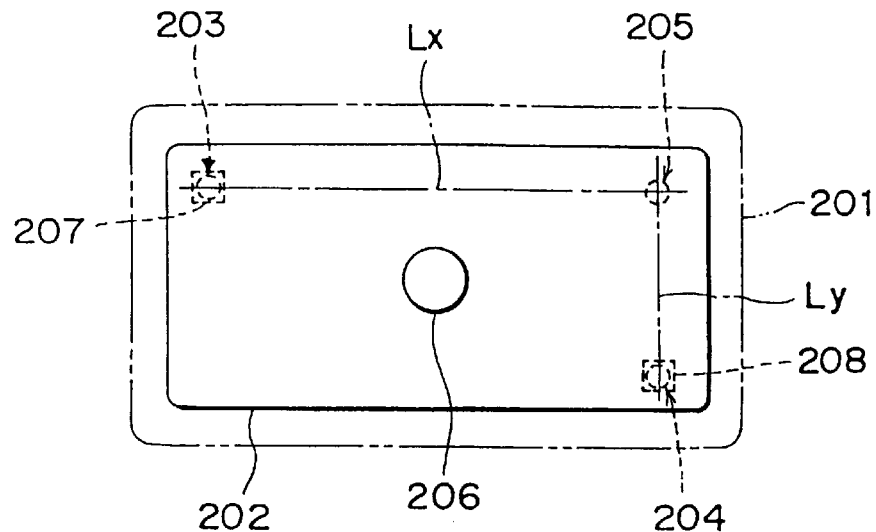
FIG. 48 is an elevational view of a conventional automobile headlamp.
Figure 49:
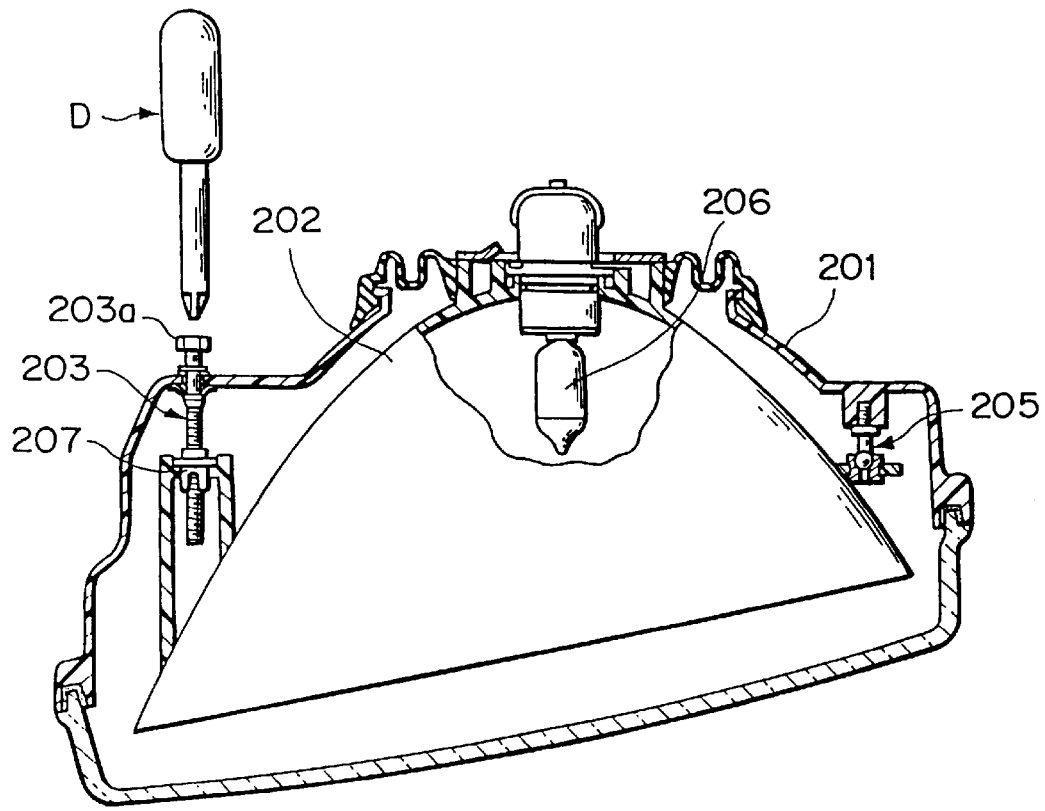
FIG. 49 is a horizontal sectional view of the headlamp above.

Therefore, the base side of the elastic hook 59 is opened forward, that is, the joint between the elastic hook 59 and the cylindrical portion 48 is U-shaped and as shown in FIG. 47. Thus, the cap 40J can be molded without the formation of an undercut by using a pair of molds 71, 72.

Although automobile headlamps have been described by way of example in the aforesaid embodiments of the present invention, the invention is not limited to such headlamps but also applicable to fog lamps and any other automobile headlamps.

As is obvious from the description given above, headlamps different in aiming specification can be made simply by fitting the cap to the pivoted portion of the aiming screw or not fitting it thereto. It is therefore possible to use a single common lamp body for headlamps different in specification and thus to assemble headlamps differing in specification with the excellent effect of reducing production costs.

Since the rear projection of the aiming screw including the pivoted portion is surrounded with the vertical wall according to one embodiment, the aiming screw is prevented from interfering with any other member, and thus from turning, as it chooses. Therefore, the optical axes of the headlamp may not deviate. Since the cap is surrounded with the pivoted portion, moreover, a specification where the horizontal aiming screw is not rotatable can be achieved.

When the cap fitted to the pivoted portion is not projected from the end portion of the opening of the vertical wall used to surround the rear projection of the aiming screw, and installed in the innermost position from the extended end of the vertical wall, the cap is difficult to remove, and ensures that the horizontal aiming screw is not rotatable in view of the specification.

Since the cap is molded by monolithic molding from plastic, it is less expensive. Moreover, the flexibility of the elastic hook is utilized for simple fitting to the pivoted portion, such that the work of fitting the cap is facilitated.

Further, the elastic hook is kept engaged with the different-in-level portion on the pivoted portion side such that the cap is fitted to the pivoted portion, and the top portion is also kept in contact with the head of the pivoted portion, whereby the cap thus fitted, never backlashes with respect to the pivoted portion.

While the elastic hook is gripping the outside face of the pivoted portion, the cap thus fitted is noiseless.

Since the whole pivoted portion is covered with the cap and kept unrecognizable, it is unnecessary to provide the vertical wall surrounding the cap with the lamp body, and a specification wherein the horizontal aiming screw is not rotatable, can be achieved.

Only the cap is idly turned even when the pivoted portion is turned, according to one embodiment, to ensure that the rotation of the horizontal aiming screw is made difficult.

Since the cap is of a rubber cup type with the rib installed inside the opening portion of the cup, its structure is far simpler than that of a plastic cap. It is thus achievable to reduce production costs.

It is contemplated that numerous modifications may be made to the present invention without departing from the spirit and scope of the invention as defined in the following claims.

What is claimed is:

1. An automobile headlamp comprising:
   a container-like lamp body;
   a light source unit disposed in said lamp body;
   an aiming mechanism comprising:
      a vertical aiming screw having a first rotatable portion disposed outside said lamp body;

a horizontal aiming screw having a second rotatable portion disposed outside said lamp body;

wherein said light source unit is made vertically and horizontally tiltable by said aiming mechanism; and wherein each of said first and second rotatable portions are turned to adjust said light source unit by tilting said light source unit vertically and horizontally; and a cap, fitted to said second rotatable portion of said horizontal aiming screw to cover said second rotatable portion thereof where horizontal aiming is unnecessary according to specifications applicable to said headlamp.

2. An automobile headlamp as claimed in claim 1, wherein said rotatable portion of said horizontal aiming screw, which is formed to engage with a rotatable tool, comprises:

a square bolt including a head portion and a shaft portion, an outer diameter of said head portion being greater than that of said shaft portion.

3. An automobile headlamp as claimed in claim 2, wherein said cap is molded by monolithic molding from plastic, said cap comprising:

a disc-like top portion which covers said head portion of said second rotatable portion of said horizontal aiming screw; and a plurality of elastic hooks extending substantially perpendicularly at equal intervals in a circumferential direction of said top portion;

wherein said elastic hooks are used to grip a side outer face of said head portion of said second rotatable portion upon application of said cap, said cap being prevented from slipping off said second rotatable portion by engaging with a different-in-level portion of said second rotatable portion.

4. An automobile headlamp as claimed in claim 3, wherein said cap further comprises:

a plurality of plate-like contact portions disposed substantially perpendicularly at equal intervals, and alternating with said plurality of elastic hooks, in said circumferential direction of said top portion, wherein said contact portions are press-fitted with said side outer face of said head portion of said second rotatable portion to firmly hold said cap over said second rotatable portion.

5. An automobile headlamp as claimed in claim 2, wherein said cap is molded by monolithic molding from plastic, said cap comprising:

a closed-end cylindrical body having a disc-like top portion which covers said head portion of said second rotatable portion of said horizontal aiming screw, said cylindrical body having a cylindrical portion formed on an outer peripheral edge of said top portion;

a plurality of slits formed at equal intervals in a circumferential direction of an outer peripheral wall of said cylindrical portion and extended longitudinally, said slits forming said cylindrical portion into a plurality of elastic hooks each having pawl portions, and a plurality of contact portions each having no pawl portions;

wherein a plurality of edge portions of a side outer face of said second rotatable portion engages with a respective slit, and said plurality of elastic hooks engage with a different-in-level portion of said second rotatable portion, such that said cap is held in place over said second rotatable portion.

6. An automobile headlamp as claimed in claim 5, wherein said cylindrical portion, including said pawl portions of said plurality of elastic hooks, are made long enough to surround said shaft portion of said rotatable portion.

7. An automobile headlamp as claimed in claim 2, wherein said cap is molded by monolithic molding from plastic, said cap comprising:

a closed-end cylindrical body having a disc-like top portion which covers said head portion of said second rotatable portion of said horizontal aiming screw, said cylindrical body having a cylindrical portion perpendicularly extended from an outer peripheral edge of said top portion and which surrounds a side outer face of said second rotatable portion;

a plurality of openings provided in at least one side wall and said top portion of said closed-end cylindrical body; and a plurality of tongue-like elastic hooks provided at equal intervals in a circumferential direction of said cylindrical portion;

wherein said plurality of elastic hooks are formed inside said cylindrical portion such that a part of said at least one side wall forming said cylindrical portion is cut and raised from said top portion of said cap to said opening portion of said cap and extended inward; and wherein a plurality of slits is formed between said plurality of elastic hooks and said at least one side wall to increase the flexibility of said elastic hooks; and wherein respective front end portions of said plurality of elastic hooks engage with a different-in-level portion of said second rotatable portion, such that said cap is held in place over said second rotatable portion.

8. An automobile headlamp as claimed in claim 2, wherein said cap is formed by monolithic molding from rubber in a cup-like shape, said cap comprising:

a closed-end cylindrical body having a disc-like top portion which covers said head portion of said second rotatable portion of said horizontal aiming screw, and having an opening for a bottom portion of said cylindrical body;

a rib circumferentially provided inside a peripheral edge of said opening portion of said cap, wherein said rib engages a different-in-level portion of said second rotatable portion; and a vent hole provided in a side face of said cap, such that when said cap is fitted to said second rotatable portion, air inside said cap is discharged through said vent hole.

9. An automobile headlamp as claimed in claim 1, wherein said second rotatable portion of said horizontal aiming screw comprises a head portion and a shaft portion, a minus slot being provided in said head portion for engagement with a minus screwdriver, and a slot being circumferentially provided in an outer peripheral face of said shaft portion as a different-in-level portion.

10. An automobile headlamp as claimed in claim 1, wherein said cap is formed by monolithic molding from rubber in a cup-like shape, said cap comprising:

a closed-end cylindrical body having a disc-like top portion which covers said head portion of said second rotatable portion of said horizontal aiming screw, and having an opening for a bottom portion of said cylindrical body;

a rib circumferentially provided inside a peripheral edge of said opening portion of said cap, wherein said rib engages said slot; and a vent hole provided in a side face of said cap, such that when said cap is fitted to said second rotatable portion, air inside said cap is discharged through said vent hole.

11. An automobile headlamp as claimed in claim 2, wherein said cap is molded by monolithic molding from plastic, said cap comprising:

a closed-end cylindrical body having a top portion which covers said head portion of said second rotatable portion of said horizontal aiming screw, said cylindrical body having a cylindrical portion perpendicularly extended from an outer peripheral edge of said top portion and which surrounds a side outer face of said second rotatable portion;

an inner cylindrical portion formed as a stepped cylinder inside said cylindrical portion and connected to a lower end of said cylindrical portion, said inner cylindrical portion extending upward along said cylindrical portion;

wherein said inner cylindrical portion comprises a tilted tapered base portion whose diameter is gradually decreased, a straight portion having an equal diameter, and a tilted tapered front end portion whose diameter is gradually decreased, said straight portion engaging with said second rotatable portion to automatically cause said cap and said second rotatable portion to be positioned with their axes conforming with each other; and a plurality of vertical slits provided at equal intervals in a circumferential direction of said inner cylindrical portion, said plurality of vertical slits providing a plurality of tongue-like elastic hooks in vertical cross-section which are formed on a divided extended end side of said inner cylindrical portion;

wherein said plurality of elastic hooks are prevented from slipping off said second rotatable portion of said horizontal aiming screw by engaging with a different-in-level portion of said second rotatable portion.

12. An automobile headlamp as claimed in claim 11, further comprising:

a vertical slit ranging from said tilted tapered front end portion to said tilted tapered base portion;

a vertical wall consecutively connecting said tilted tapered base portion up to a midpoint of said straight portion for securing a rigidity of said plurality of elastic hooks;

an opening portion provided in said top portion of said closed-end cylindrical body;

a recess provided in said top portion to stop generation of a sinkage;

a horizontal rib radially extending to separately form said opening portion and provided in a position corresponding to said vertical slit; and a vertical rib consecutively connected to said horizontal rib and provided in a region between said top portion on an inner peripheral face of said cylindrical portion of said cap and said plurality of elastic hooks, such as to obviate any backlashing between said cap and said second rotatable portion.

13. An automobile headlamp as claimed in claim 1, wherein said second rotatable portion of said horizontal aiming screw is incorporated into said horizontal aiming screw such that central axes of both said second rotatable portion and said horizontal aiming screw conform to each other and are formed with a coronal gear having a toothed portion which is engaged with a rotatable tool disposed in a direction substantially perpendicular to said horizontal aiming screw.

14. An automobile headlamp as claimed in claim 13, further comprising a two-way driver guide incorporated in said lamp body, said driver guide guiding said second rotatable tool such that said rotatable tool contacts said toothed portion of said coronal gear and said coronal gear turns said horizontal aiming screw, to make said horizontal aiming screw adjustable.

15. An automobile headlamp as claimed in claim 14, wherein said cap comprises:

a closed-end cylindrical body having a top portion covering an edge face of said coronal gear, said cylindrical body having a cylindrical portion perpendicularly extended from an outer peripheral edge of said top portion and which surrounds a side outer face of said coronal gear, said cylindrical portion being divided into a plurality of vertical slits which form a plurality of tongue-like elastic hooks disposed at equal intervals in a circumferential direction, said plurality of elastic hooks being alternately and consecutively connected in said circumferential direction;

wherein said plurality of elastic hooks have respective pawls which are brought into contact with a front edge portion of said toothed portion of said coronal gear and are projected from respective insides of said plurality of elastic hooks, whereby said plurality of elastic hooks grip said side outside face of said coronal gear to prevent said cap from slipping off.

16. An automobile headlamp as claimed in claim 12, wherein a base side of said plurality of elastic hooks are opened forward such that a joint between said plurality of elastic hooks and said cylindrical portion is U-shaped, so that said cap can be molded without formation of an undercut.

17. An automobile headlamp as claimed in claim 2, wherein a mating slot for permitting a toothed portion of a rotatable tool to engage therewith is formed in an edge face of said second rotatable portion of said horizontal aiming screw.

18. An automobile headlamp as claimed in claim 1, wherein said lamp body is made of plastic and includes a vertical cylindrical wall surrounding at least said second rotatable portion of said horizontal aiming screw and said cap fitted to said second rotatable portion, said vertical wall being extended outward from said lamp body.

19. An automobile headlamp as claimed in claim 2, wherein an inner diameter of said cylindrical portion of said cap is set greater than a maximum outer diameter of said second rotatable portion, whereby said cap is idly turned with respect to said second rotatable portion.

20. An automobile headlamp as claimed in claim 1, wherein said cap is molded by monolithic molding from plastic, said cap comprising:

a disc-like top portion which covers said head portion of said second rotatable portion of said horizontal aiming screw; and a plurality of elastic hooks extending substantially perpendicularly at equal intervals in a circumferential direction of said top portion;

wherein said elastic hooks are used to grip a side outer face of said head portion of said second rotatable portion upon application of said cap, said cap being prevented from slipping off said second rotatable portion by engaging with a different-in-level portion of said second rotatable portion.

* * * * *